(12) United States Patent
Holenstein et al.

(10) Patent No.: US 7,949,640 B2
(45) Date of Patent: May 24, 2011

(54) REFERENTIAL INTEGRITY, CONSISTENCY, AND COMPLETENESS LOADING OF DATABASES

(75) Inventors: Paul J. Holenstein, Downingtown, PA (US); Bruce D. Holenstein, Media, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 0 days.

(21) Appl. No.: 12/609,825

(22) Filed: Oct. 30, 2009

(65) Prior Publication Data

US 2010/0114841 A1 May 6, 2010

Related U.S. Application Data

(60) Provisional application No. 61/110,271, filed on Oct. 31, 2008.

(51) Int. Cl.
*G06F 7/00* (2006.01)
*G06F 17/00* (2006.01)
(52) U.S. Cl. ...................................................... 707/690
(58) Field of Classification Search .................. 707/600, 707/602, 607, 609, 610, 674, 675, 686, 687, 707/690, 999.201
See application file for complete search history.

(56) References Cited

U.S. PATENT DOCUMENTS

| 4,933,848 | A  | * | 6/1990 | Haderle et al. ................. 364/300 |
| 6,427,143 | B1 | * | 7/2002 | Isip et al. ............................ 707/1 |
| 7,003,531 | B2 |   | 2/2006 | Holenstein et al. |
| 7,321,904 | B2 |   | 1/2008 | Holenstein et al. |
| 2004/0215670 | A1 | * | 10/2004 | Holenstein et al. ........... 707/201 |
| 2004/0236744 | A1 | * | 11/2004 | Desai et al. ....................... 707/8 |
| 2005/0192989 | A1 | * | 9/2005 | Adiba et al. ................... 707/101 |
| 2006/0117095 | A1 | * | 6/2006 | Barghouthi et al. ........... 709/219 |
| 2006/0242205 | A1 | * | 10/2006 | Schmidt et al. ............... 707/200 |
| 2007/0208787 | A1 | * | 9/2007 | Cheng et al. .................. 707/204 |
| 2008/0109496 | A1 |   | 5/2008 | Holenstein et al. |
| 2008/0109497 | A1 |   | 5/2008 | Holenstein et al. |
| 2010/0082532 | A1 | * | 4/2010 | Shaik et al. ................... 707/609 |

\* cited by examiner

*Primary Examiner* — James Trujillo
*Assistant Examiner* — Marc Somers
(74) *Attorney, Agent, or Firm* — Panitch Schwarze Belisario & Nadel LLP

(57) ABSTRACT

A method is provided for loading data from a source database to a target database that includes at least one table. Prior to loading the data from the source database into the target database, at least one referential integrity constraint and/or at least one consistency requirement regarding the data is automatically identified. A subset of the data that satisfies the at least one referential integrity constraint and/or consistency requirement is then automatically identified. The identified subset of the data is then loaded into the target database as a unit of work.

44 Claims, 15 Drawing Sheets

Process Flow

**ETL – Extract/Transform/Load

Online Loading with Change Queuing

Online Loading with Concurrent Change Replication

The Online Load Problem

SOLV

One-to-Many Entity Relationship

A Simplified Order-Entry Database

Many-to-Many Entity Relationship

Denormalized Entity Relationship

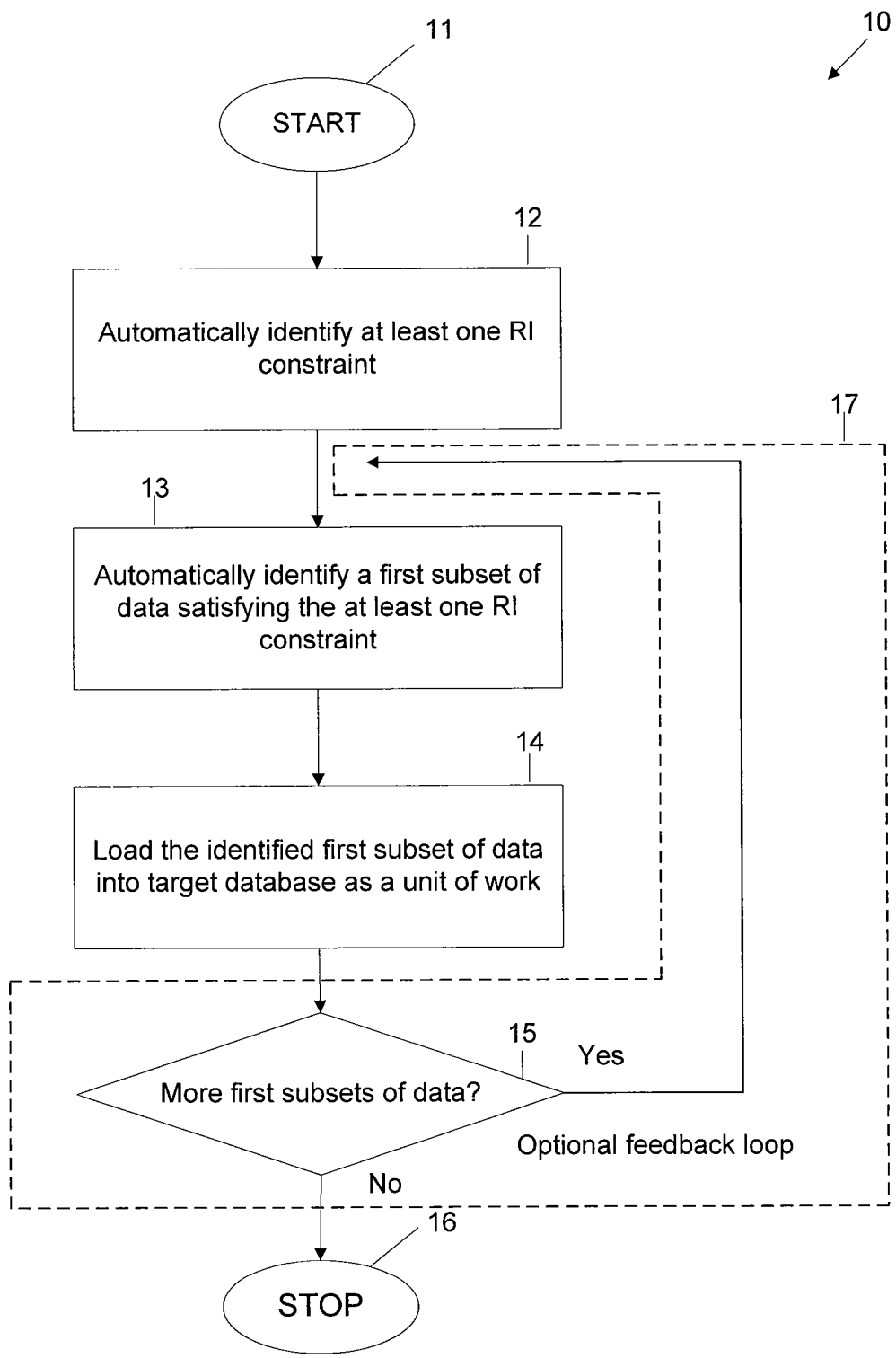
Figure 10a – Process Flow

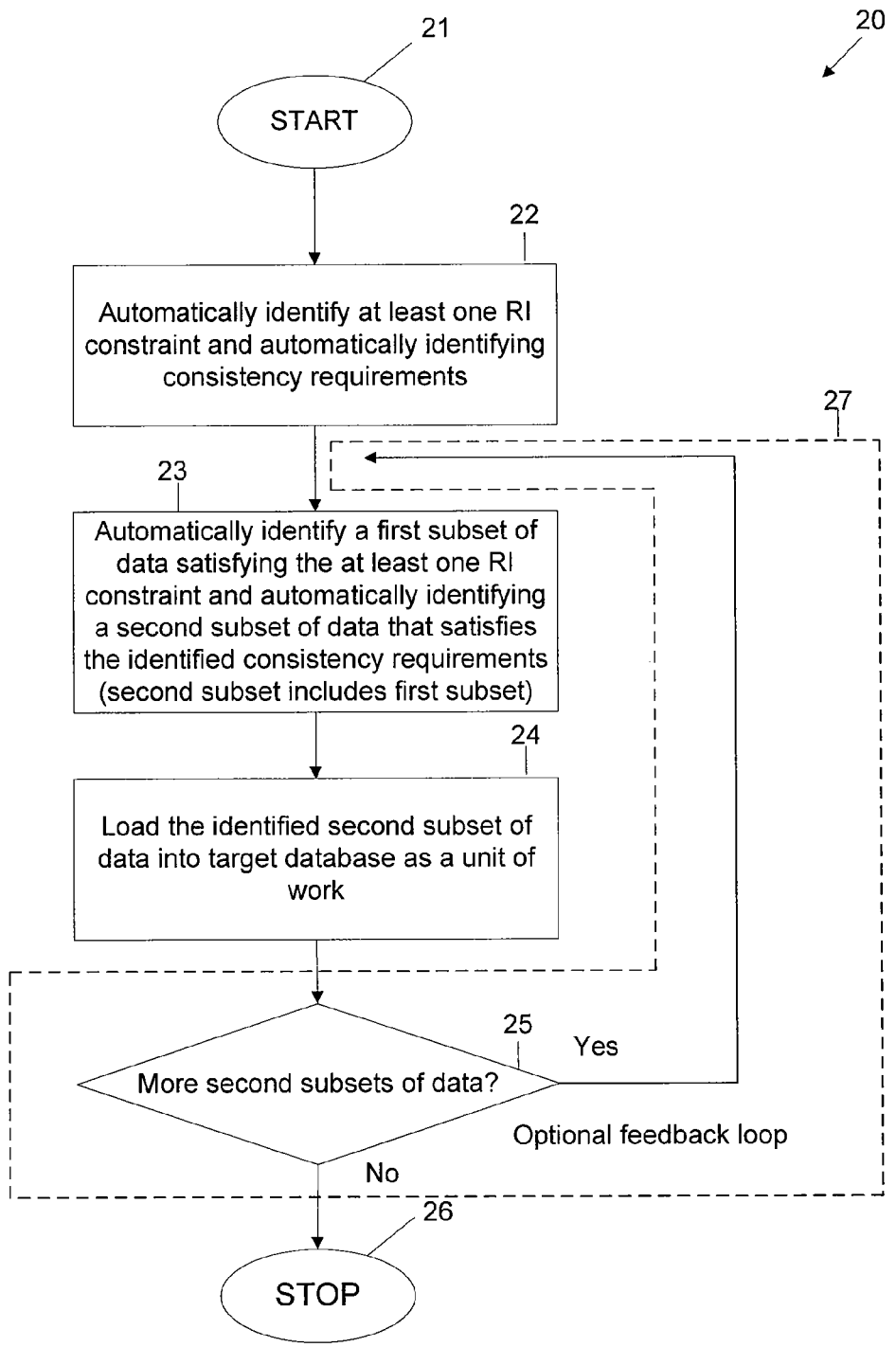
Figure 10b – Process Flow

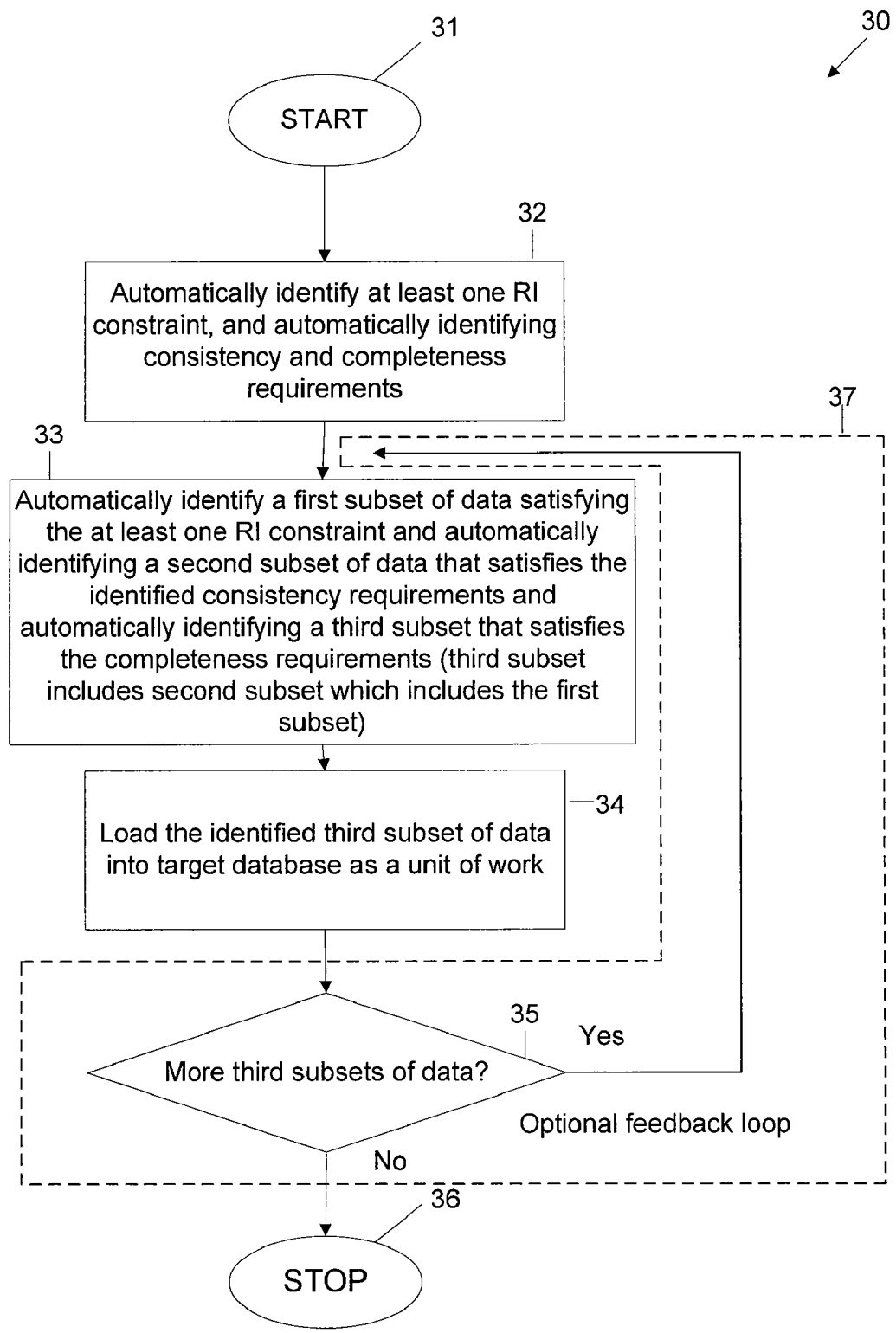
Figure 10c – Process Flow

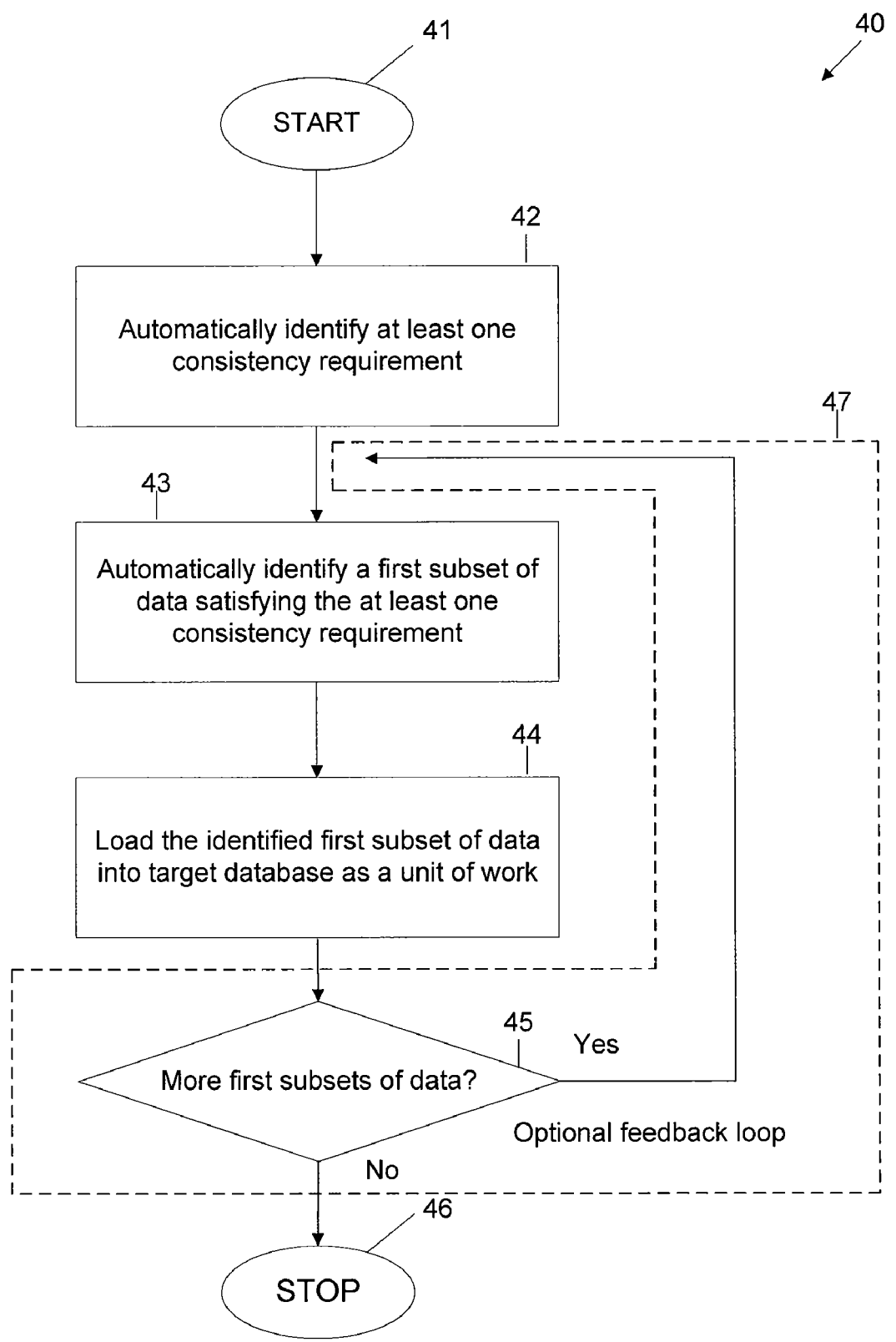
Figure 10d – Process Flow

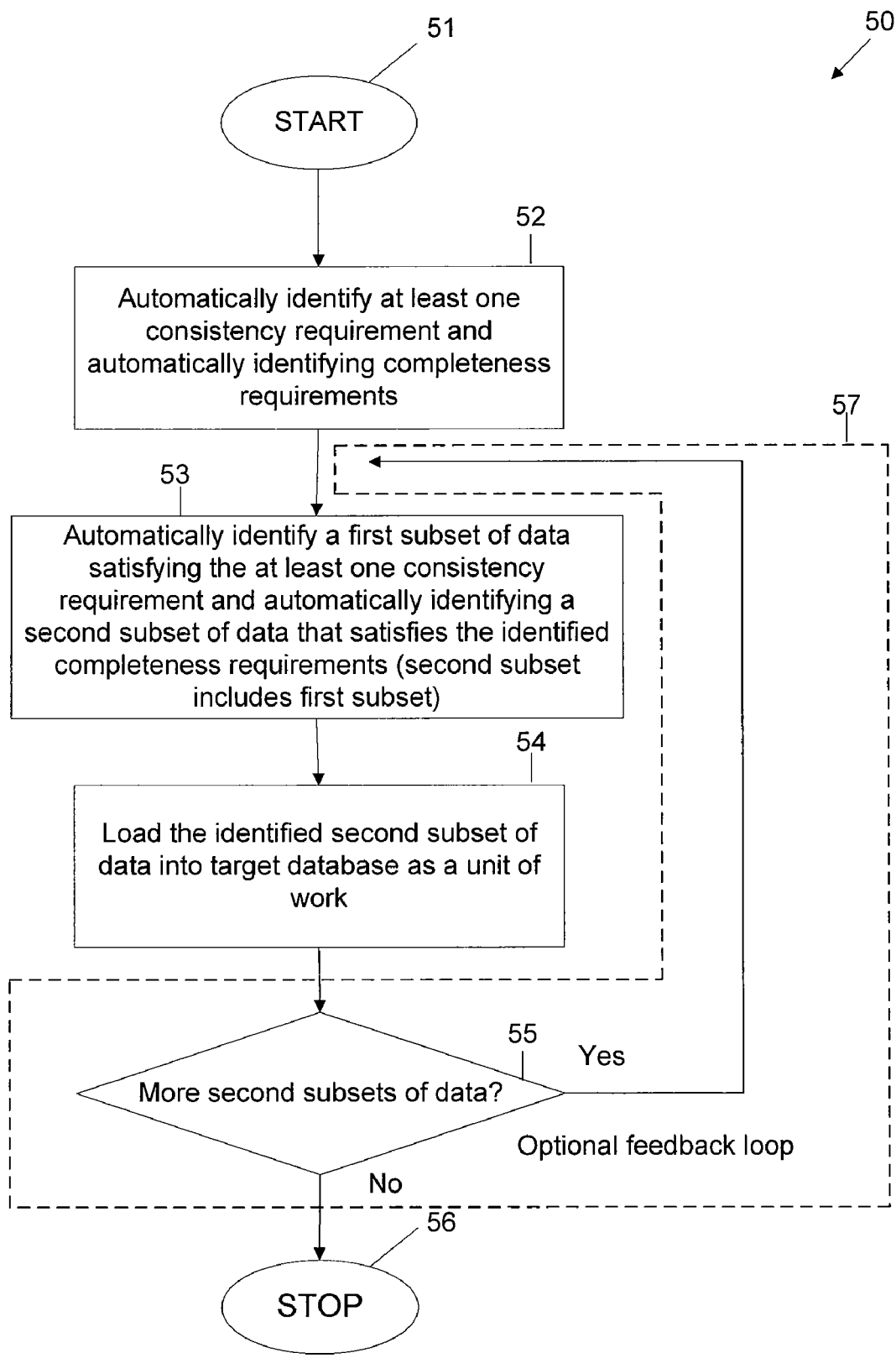
Figure 10e – Process Flow

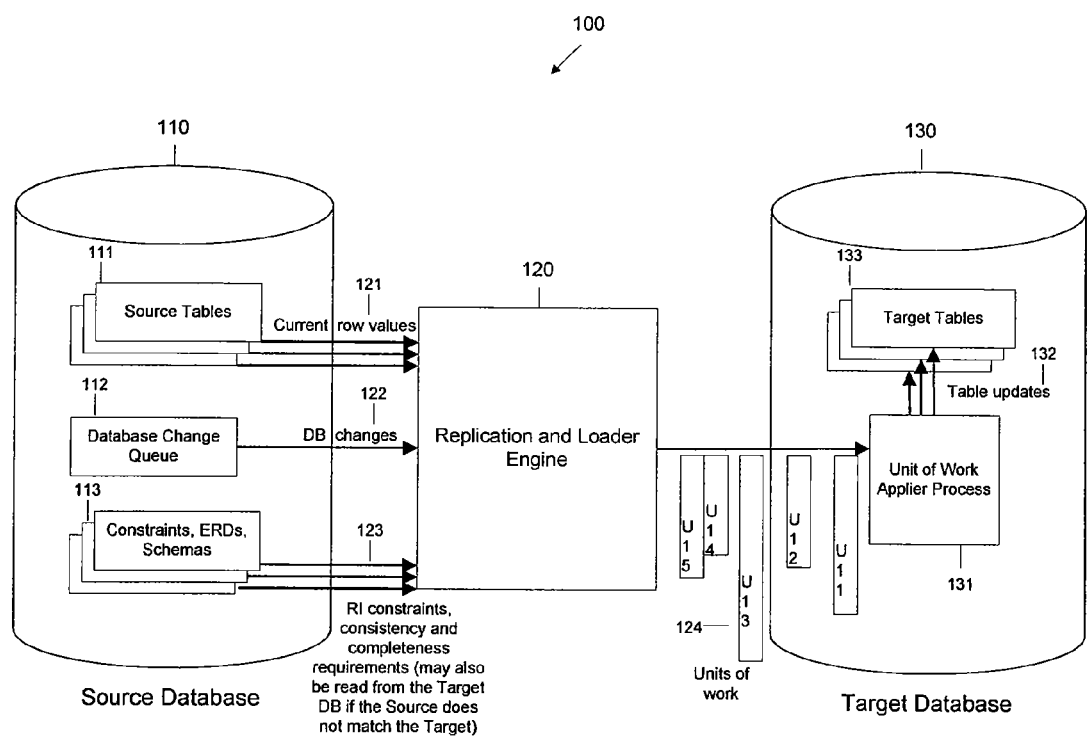
Figure 11 – System Diagram

REFERENTIAL INTEGRITY, CONSISTENCY, AND COMPLETENESS LOADING OF DATABASES

CROSS-REFERENCE TO RELATED APPLICATIONS

This application claims the benefit of U.S. Provisional Application No. 61/110,271 filed Oct. 31, 2008.

BACKGROUND OF THE INVENTION

In today's global economy, many critical computing systems operated by enterprises must be available continuously. They must be up and running 24 hours per day, 365 days per year. In order to achieve such availability, redundancy is required. An enterprise must protect itself from the failure of a critical system by having another operational system that it can quickly bring into service should its primary system fail or, even worse, should its data center be destroyed or disabled by some disaster. This redundant system can be a passive standby system, or it can be another node in an active/active network, in which all nodes are actively engaged in a common application. An active/active system is a network of independent processing nodes, each having access to a common replicated database. All nodes can cooperate in a common application, and users can be serviced by multiple nodes.

In order to be effective, the redundant system must have a current copy of the application database. The copy must be complete, accurate, and consistent. In order to initially create a redundant database copy, a database loading facility is typically used to copy the contents of a currently active operational database to the target database copy.

For large databases, the creation of a backup database copy can take hours or even days. During this time, it is often important that the portion of the target database that has been loaded can be used for active processing. In order for it to be useful, the partially-loaded target database must be consistent. Consistency requires that all user-defined data constraints be satisfied (if defined on the data), that every child row has a parent row (this latter condition is known as referential integrity or referential integrity constraints), and may require that every row in the database be uniquely identified by a primary key (this is often useful for enforcing referential integrity constraints). A child row is a row that has a "foreign key" that points to another row, the parent. That parent row must exist. In some databases, there are no referential integrity constraints defined. In this case, there are no child/parent relationships and no foreign key relationships to be checked or maintained during a load. In still other databases, there may be child/parent and foreign key relationships, but the database itself per se does not directly enforce these relationships (NonStop® SQL/MP, commercially available from Hewlett-Packard (HP®), is one example). In these databases, it is preferable to maintain these relationships during the load sequence in order for the target database to be maximally useful while the load occurs.

There are many methods in today's art for loading a target database from an active source database. However, these methods do not provide for either referential integrity or for the broader attribute of consistency at the target database while the load is taking place. For instance, a partially-loaded target database that does not satisfy these attributes may contain the detail lines (the children) of an invoice (the parent) that does not yet exist on the target database (a referential integrity violation). Therefore, a query that requires the invoice header information for a detail line will fail if the query is made against the target database. Alternatively, a user-defined data constraint that requires that an invoice total in the invoice header be the sum of the amounts in each of the invoice's detail lines cannot be reconciled against the detail lines if those rows do not all exist (a consistency violation).

If a partially-loaded database has a parent row for every child row and furthermore has all of the child rows associated with each parent row, and if all data constraints are satisfied for the data that has already been loaded, then the portion of the database that has been partially loaded is said to be complete. That portion of such a target database is fully usable (useful) in an application, and it accurately reflects the source database for the portion that has been loaded. In the above example, if all loaded detail lines have an invoice, if all loaded invoices have all of their detail lines, and if all data constraints are satisfied for the data that has been loaded, the partial database is complete and is typically usable by an application.

Furthermore, the target database can have consistency checking enabled during the load. This avoids the problem of having to turn off target consistency checking before the load begins and then finding that it cannot be enabled following the load because of consistency violations.

What is needed is a method of database-loading which satisfies multiple, optional levels of database correctness. The first level includes referential integrity. The second level includes consistency, which includes referential integrity (if present). At the highest level, completeness in included, which also includes referential integrity (if present) and consistency.

BRIEF SUMMARY OF THE INVENTION

In one preferred embodiment of the present invention, a method is provided for loading data from a source database to a target database that includes at least one table. Before loading the data from the source database, applicable referential integrity constraints, consistency, and completeness requirements are identified regarding the data to be loaded. The constraints and requirements may span one or more tables. A subset of the data to be loaded that satisfies the constraints and requirements is identified. The identified subset of data is loaded as a unit of work so that the constraints and requirements are satisfied during the load. Additional subsets of data are optionally subsequently loaded. In the preferred embodiment, the units of work are a transaction with ACID (atomicity, consistency, isolation, durability) properties.

In some embodiments of the present invention, the constraints and requirements are relaxed during the load so that manageable subsets of the data to be loaded are used. In other embodiments, the load is performed while the source database, target database, or both databases are usable, online, or open for reading and/or updates, or while integrated change replication is underway.

BRIEF DESCRIPTION OF THE DRAWINGS

The foregoing summary as well as the following detailed description of preferred embodiments of the invention will be better understood when read in conjunction with the appended drawings. For the purpose of illustrating the invention, the drawings show presently preferred embodiments. However, the invention is not limited to the precise arrangements and instrumentalities shown. In the drawings:

FIGS. 10A-10E show process flows in accordance with preferred embodiments of the present invention.

FIG. 11 shows the a system diagram in accordance with preferred embodiments of the present invention.

DETAILED DESCRIPTION OF THE INVENTION

Figure 1:
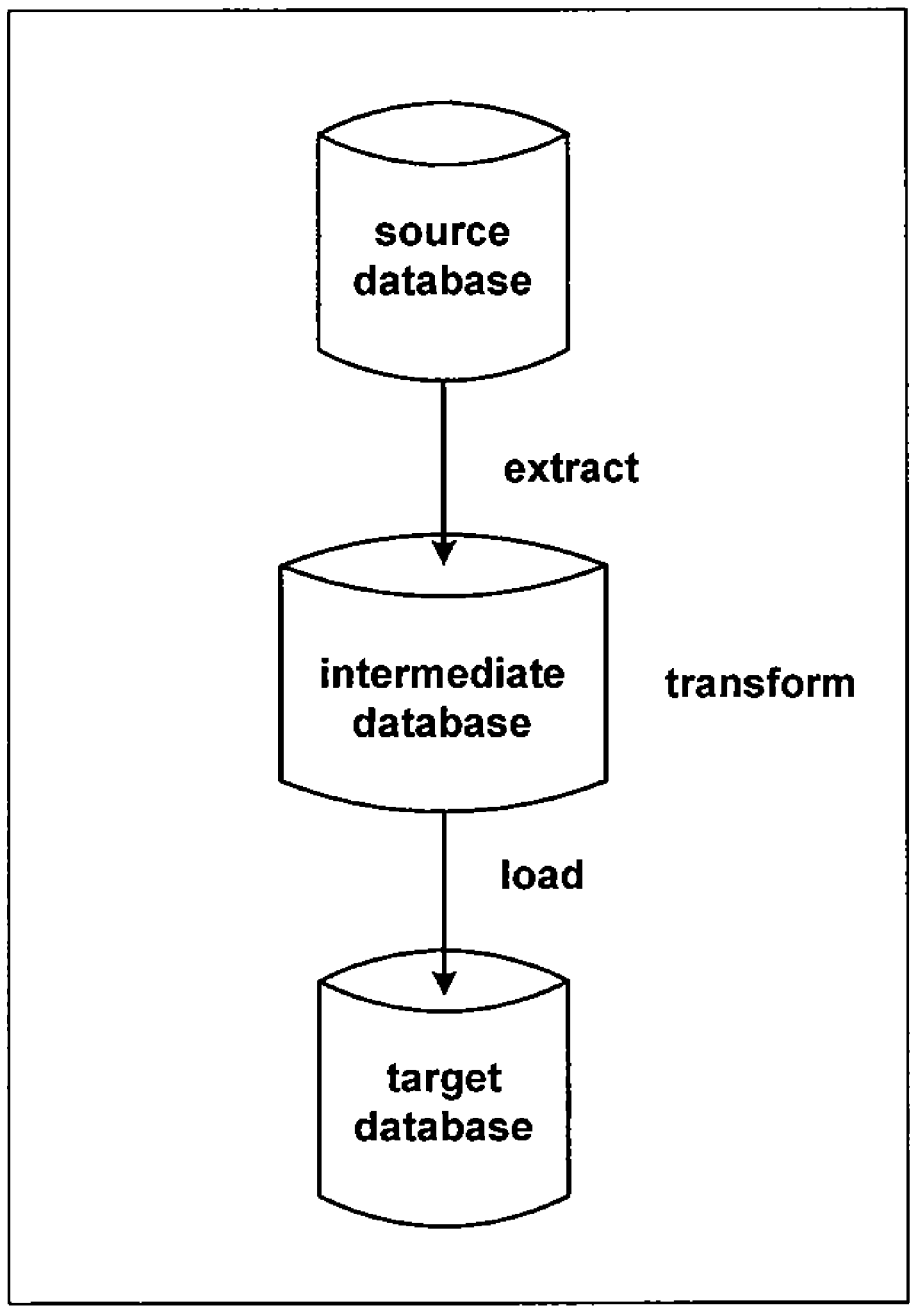
FIG. 1 shows a prior art Extract/Transform/Load (ETL) system.

Certain terminology is used herein for convenience only and is not to be taken as a limitation on the present invention. In the drawings, the same reference letters are employed for designating the same elements throughout the several figures.

I. DEFINITIONS

The following definitions are provided to promote understanding of the present invention. The definitions are meant to incorporate the art for relational database objects and terminology. They are hierarchically ordered in that each definition builds on previous definitions.

Entity—An object with a distinct, separate existence. An entity may by physical or abstract. For instance, a physical entity may be an employee. An abstract entity may be a religion.

Entity Instance—An instantiation of a particular entity. For instance, John Smith may be an instantiation of an employee entity.

Entity Set—A group of entity instances. An entity set is usually implemented as a table in a relational database or as a file in a nonrelational database (defined below).

Table—A set of data values that is organized using a model of horizontal rows and vertical columns. The columns are identified by name, and the rows are uniquely identified by the values appearing in a particular column subset (the table's primary key, defined below). A table usually characterizes an entity set. Each row in the table describes an instance of the entity set. Each column describes an attribute of the entity set. Tables are entity sets in a relational database.

File—The equivalent of a table for nonrelational databases. A file is made up of records, and each record describes an entity instance. A record is made up of fields, each of which describes an attribute of the entity set. In this specification, the term "table" is to be interpreted as "table or file."

Column—A table component that holds a single attribute of the entity set, such as SALARY.

Field—A file component that holds a single attribute of the entity set, such as SALARY. In this specification, the term "column" is to be interpreted as "column or field."

Row—A table component that represents an entity instance. It is a sequence of {column name, value pairs} usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" is to be interpreted as "row or record."

Primary Key—A column or combination of columns that typically uniquely identifies each row in a table. For instance, EMPLOYEE NUMBER for the EMPLOYEE table. Alternatively, the physical or logical position of the record or row for certain database systems. There may be more than one primary key in a table.

Foreign Key—A column or combination of columns that contains the primary key(s) of another table or row. For instance, the DEPARTMENT column in an EMPLOYEE table, where the DEPARTMENT table contains the individual departments (as rows) in the company. There may be more than one foreign key in a row.

Child—A row that contains at least one foreign key.

Parent—A row that has a primary key equal to one or more foreign keys. Parent/child relationships are not necessarily hierarchical. For instance, two rows in different tables may point to each other. Each is a parent to the other row.

Referential Integrity (RI)—A database property (or database constraint) in which any column (or set of columns) that is declared a foreign key can contain only values from another table's (the parent's) primary key. That is, every child must have a parent. Referential integrity is usually defined between multiple tables in the database.

Data Constraint—A user-defined relationship between rows (or the columns in rows) in the same table or in different tables. For instance, the sum of all automated teller machine (ATM) transactions for one person for one day cannot exceed $500.

Integrity Constraint—Used to ensure the accuracy of data in a database, most commonly implemented in a relational database. Integrity constraints include referential integrity (if present), user-defined data constraints, and the (sometimes optional) requirement that every table have a unique primary key. In some databases, referential integrity might not be used or may not exist. However, there still may be at least one consistency requirement.

Consistency Requirement—Used synonymously with integrity constraint. Satisfying the integrity constraints makes the data consistent, it gives the data (or database) the consistency property.

Database—A collection of related tables.

Schema—The structure of an entire database, including the structure of the individual tables (column data types, etc), foreign-key relationships, data constraints, and possibly other table attributes, including information such as table size, physical location, etc.

Metadata—The information that describes the schema, usually implemented as a table or as a set of tables.

Entity Relationship (ER)—The relationship of all tables (entities) in a database. Relationships are usually specified via foreign keys as well as via other data constraints.

Entity-Relationship Diagram (ERD or ER Diagram)—A diagram that shows the entity relationships between the tables in a database.

Source Database—The current application database, or the database that is being loaded into the target database.

Source System—The system holding the source database.

Target Database—The database into which the current application database is being loaded (in some cases, this may be the same database as the source database).

Target System—The system holding the target database (can be the same system as the source system).

Load—The act of copying a source database to a target database.

Update—The act of modifying a database by inserting, changing, or deleting data.

Online Database—A database that is available for reading and updating.

Offline Database—A database that is not available for updating. It may be available for reading. For some database load facilities, the target database is offline until the load completes.

Usable Database—a database that is useful to an application and will return accurate and complete results to the application when the application runs for the portion of the database that has been loaded. In some cases, if the portion of the database that has been loaded exhibits relaxed completeness, that database is also useful to an application.

Lock—Prevents data from being corrupted or invalidated when multiple users try to write to a row. Any single user can only modify those database rows to which it has been granted a lock that gives it exclusive access. Additionally, a lock is often used to prevent inconsistent data from being read by applications. For instance, data being updated is typically locked until its transaction is committed.

Database Transaction—a construct that provides for processing database data reliably, preserving the ACID properties for the events (e.g., inserts, updates, and deletes) in the transaction. A database transaction processes all of the events in it as a single unit of work.

Unit of Work—a logical grouping of a set of events to be applied against a database. A unit of work usually has the atomicity property. Database transactions are often used to insure the unit of work has the atomicity property.

ACID—A set of properties that guarantee that database transactions are processed reliably. They consist of atomicity (a guarantee that either all of the events of a transaction are performed or none of them are), consistency (ensures that the database remains in a consistent state before the start of the transaction and after the transaction is over (whether successful or not)), isolation (refers to the requirement that other operations cannot access or see the data in an intermediate state during a transaction), and durability (refers to the guarantee that once the user has been notified of success, the transaction will persist, and not be undone).

Concurrent Access—Two or more users operating on the same rows in a database at the same time. Access is typically sequenced via locks. However, not all access to the data requires that a lock is needed or maintained after the data is read, provided that a consistent copy of the data is returned.

II. ADDITIONAL BACKGROUND

A. The Need for Redundancy in the IT Infrastructure

In today's global economy, many critical computing systems operated by enterprises must be available continuously. They must be up and running 24 hours per day, 365 days per year. In order to achieve such availability, redundancy is required. An enterprise must protect itself from the failure of a critical system by having another operational system that it can bring into service should its primary system fail or, even worse, should its data center be destroyed or disabled by some disaster. Disasters can range from natural disasters, such as hurricanes, floods, or earthquakes, to site disasters, such as data-center fires or massive hardware failures. Other disasters are man-made, such as social unrest, terrorist acts, quarantines to contain infectious diseases, or catastrophic operator actions or program bugs.

In order to be effective, the backup system must have a reasonably current copy of the application database available to it. The term reasonably current refers to the ability of the enterprise to withstand the loss of its most recent transactions. The enterprise's ability to tolerate data loss is called its Recovery Point Objective (RPO). In some applications, the RPO might be hours or even days of data loss. In others, it might be minutes or seconds. In still others, no loss of data may be acceptable.

Depending upon the backup technique, the time to reload the database and bring the backup system into service can range from nearly instantaneous to days. This time is known as the Recovery Time Objective (RTO). The RTO can be significantly improved if a partially-recovered backup system can be put to immediate application use. This often requires that the partially-loaded backup database satisfy referential integrity and perhaps be consistent and/or complete. Providing referential integrity, consistency, and/or completeness during the load process is the subject of this invention.

B. Database Backup Techniques

To accommodate various RPOs and RTOs, several database backup techniques have been developed over the years:

1. Tape Backup is the classic method for backing up data. Tape copies of the current database are periodically made. They may be full backups or backups of just the database changes made since the last full backup (an incremental backup). Full or incremental backups might be taken daily, weekly, or on whatever schedule satisfies the company's RPO. Should the primary system fail, the database is loaded onto the backup system from tapes. This involves loading the last full backup followed by any incremental backups that are more recent. Database loading from tape can result in an RTO of hours or even days for very large databases. Furthermore, all data since the last full or incremental backup is lost, resulting in a very large RPO.

2. Virtual Tape is a newer technology in which backups are transmitted to the backup site and stored on local disk instead of tape (though the backups may also be sent to a tape vault for storage). Should the primary fail, the backup database can be loaded from disk rather than tape. Because of this, database loading can generally be done in minutes to hours rather than hours to days, resulting in a faster RTO than can be achieved with tape backups. Furthermore, incremental backups can often be taken more frequently; and the RPO can be reduced to hours or portions thereof 3. Asynchronous Data Replication is an advance over virtual tape. Rather than periodically transmitting backups to disk storage local to the backup site, data changes are transmitted to a database at the backup site as they occur and are applied to the backup database in real, or near-real, time. These data changes are often changes at the transaction level, which generally consists of the application's business unit-of-work logic. Thus, should the primary site fail, only those transactions that were committed on the source but not yet fully delivered and/or applied to the target (i.e., the transactions that were in flight at the time of failure) are lost, leading to an RPO that can be measured in seconds or minutes. Failover to the backup system requires aborting any in-flight transactions, starting the applications if they are not already running, and testing the backup system before putting it into service. An RTO of a fraction of an hour can often be achieved. Alternatively, RTO can be shortened if the replication engine allows the target applications to be up and running in read-only mode.

4. Synchronous Data Replication is similar to asynchronous data replication except that the source transaction is not considered to be complete (fully committed) until it has also been applied to the target database (or at least safe-stored by the target system for later application).

Synchronous replication may increase application response time since the application must wait for the transaction to be acknowledged by the target system. However, in the event of a primary system failure, no data is lost, leading to an RPO of zero. RTO is the same as with asynchronous data replication—a fraction of an hour.

5. Active/Active Systems are networks of independent processing nodes as described in W. H. Highleyman, P. J. Holenstein, B. D. Holenstein, "Breaking the Availability Barrier: Survivable Systems for Enterprise Computing," AuthorHouse; 2004. Each node has its own copy of the application database, and each node can independently execute transactions against its copy of the database. Any changes that are made to a node's database are replicated either asynchronously or synchronously to the other nodes in the application network. RPO is the same as for the asynchronous or synchronous data-replication methods described above, but failover can be accomplished in subseconds to seconds since it is only necessary to switch users from the failed node to one or more surviving nodes. Thus, the RTO for active/active systems can be very small.

Data replication and active/active systems represent a paradigm shift in redundant backup. Rather than having access to an offline copy of a stale application database that must be loaded onto the backup system before it can be brought into service, these newer techniques maintain an online copy of the database on the backup system or on other active nodes. The redundant copy of the database can be within seconds of being current if asynchronous replication is used or absolutely current if synchronous replication is used.

This new paradigm, however, poses a problem—how does one initially create a redundant copy of the application database?

C. Creating a Redundant Copy of an Active Database

Backup systems depending upon data replication require that the backup node have a current version of the application database. Likewise, every node in an active/active network must have a current version of the application database. This then leads to the problem of how to create a current copy of the database on a new target system without having to pause the processing activities of the source system. After all, the purpose of redundancy is to preclude the loss of services to the users of the system.

Thus, the problem of creating an initial redundant copy of the application database is compounded by the fact that many changes will be applied to the source database as it is being loaded onto the target database. It might take hours (or even days) to finish an initial load of the database onto a target system, but that data might be changing hundreds or even thousands of times per second. For very active databases, the amount of change data that occurs while the load is running may be many times the amount of data to be loaded.

Creating a redundant copy of the database can be considered an extract/transform/load operation. This is referred to in the art as ETL. FIG. 1 shows a simplified view of the ETL functions. Data is first extracted from the source database. It may be the entire database, or it may just be a portion of the database. For instance, it may be a partition or a specified key range.

The data is generally loaded into an intermediate database or storage area. There it may undergo certain transformations. This is because the target database may have a different structure from the source database. Certain rows may be removed (filtered out). Rows may be reformatted, with the new rows selecting different fields from the source rows. Data may be converted, for instance, from foreign currency to U.S. dollars. New fields may be created by an aggregation of values in the source data. As an example, a new field might be a summation of the values of fields in the source data or might be extensions such as total price=quantity×unit price. However, when used to create a redundant copy of a source database that is to be an exact copy, as would be done in a business continuity architecture, there is often little or no need for data transformation.

Finally, the transformed data is loaded into the target database. If this pass includes only a portion of the source database, the procedure is repeated until the entire source database or as much as is needed has been loaded.

There are two primary methods for using ETL to load an active database into a target database—offline ETL and online ETL.

D. Offline ETL

Offline ETL is the classic use of ETL. It does not attempt to create a current copy of the source database. Rather, it is usually used to create a "point-in-time," or snap-shot, copy of the source database. This means that the target database is an accurate representation of the source database at some particular time in the past—the time at which the ETL function was initiated.

A point-in-time copy requires that somehow a static copy of the source database be presented to the ETL function. This can be done by pausing activity on the source database during the time required to extract the source data (which means that the source system is providing no user services that depend upon updates during this time) or by taking a source-database "snapshot" that can be used by the extract function.

If the source database is paused, it is usually paused in a consistent state. This is often accomplished by allowing all transactions currently in process to complete before the source system is paused—for instance, by requesting a lock on the entire database. As long as one or more transactions hold locks on the data items they are updating, the database lock will not be granted. Once all previous transactions release their locks, the database lock is granted; and no further update activity can take place until that lock is released. Some database systems differentiate shared-read locks from exclusive-update locks. In this example, the extract might use a shared-read lock that has to wait behind any granted exclusive-update locks. Subsequent exclusive-update lock requests will wait for the extract's shared-read lock to complete. However, the extract does not have to wait for other application shared-read locks to be released; and other application read operations can be executed during the time that the extract has data locked via a shared-read lock.

One method for providing a snapshot copy of the source database is to mark the time at which the snapshot is initiated. Then whenever a row in the source database is changed, its original value at the snapshot time is saved in a snapshot area. The extract function will normally read the row from the database proper. However, if that row has changed since the snapshot began, the extract function will read that row from the snapshot area.

The target database being loaded by offline ETL is inconsistent and is generally not usable by an application, for example due to the data being loaded being inconsistent, or even accessible, during the target load. It is an accurate copy of the source database only after it has been fully loaded with the extract data as well as any snapshot data. Therefore, there is no target concurrency during the load. There may be source concurrency if a snapshot is taken but not if the source system has to be paused (for database change activity) during the ETL process.

Furthermore, special steps must be taken to ensure transactional consistency in the resulting target database. If the source system is to be paused, new transactions must be prohibited; and existing transactions must be completed before the source system can be paused. If a snapshot is to be taken, the contents of any locked rows at the time of the snapshot must be ignored; and only their contents immediately after they are unlocked are considered their snapshot values.

Offline ETL results in a consistent but stale copy of the database at the target system. Source concurrency can be achieved by using snapshots so that the source database does not have to be paused during the copy, but target concurrency is not provided during the load. However, the performance of offline ETL can be very high. High performance can be achieved by using bulk extracts and loads and by running several ETL threads on different portions of the database simultaneously.

Offline ETL is primarily used to load data into a data warehouse. The warehouse data is updated periodically either by performing another ETL extract and load or by a Change Data Capture (CDC) utility. CDC sends to the target database only those rows that have changed since the last ETL or CDC update. Changes are generally tracked via an extra row column that contains a timestamp of the last update, a version number, or a status field. The result is that if multiple changes have occurred to a row since the last update, only the last change is sent to the target database. Alternatively, an audit trail of all changes can be parsed to select only the last change to each row. CDC is similar to a snapshot except only the changes since the last update are sent rather than the entire database.

E. Online ETL

Though very useful for applications such as data warehousing, offline ETL is inappropriate for building a redundant database backup copy that will be kept current via data replication; nor is it appropriate for redundant copies used in an active/active architecture. This is because the resulting database is stale. Its data is outdated. If the offline ETL took several hours to run, the resulting target database is several hours old.

To solve this problem, online ETL utilities have been developed. Fundamentally, these techniques provide an online load function that copies data concurrently from an active source database (that is, without substantively affecting the concurrent use of the source database by source applications). The target database copy is kept current as it is being loaded by replicating changes that occur during the load process to the target database.

F. Online Loading with Change Queuing

Figure 2:
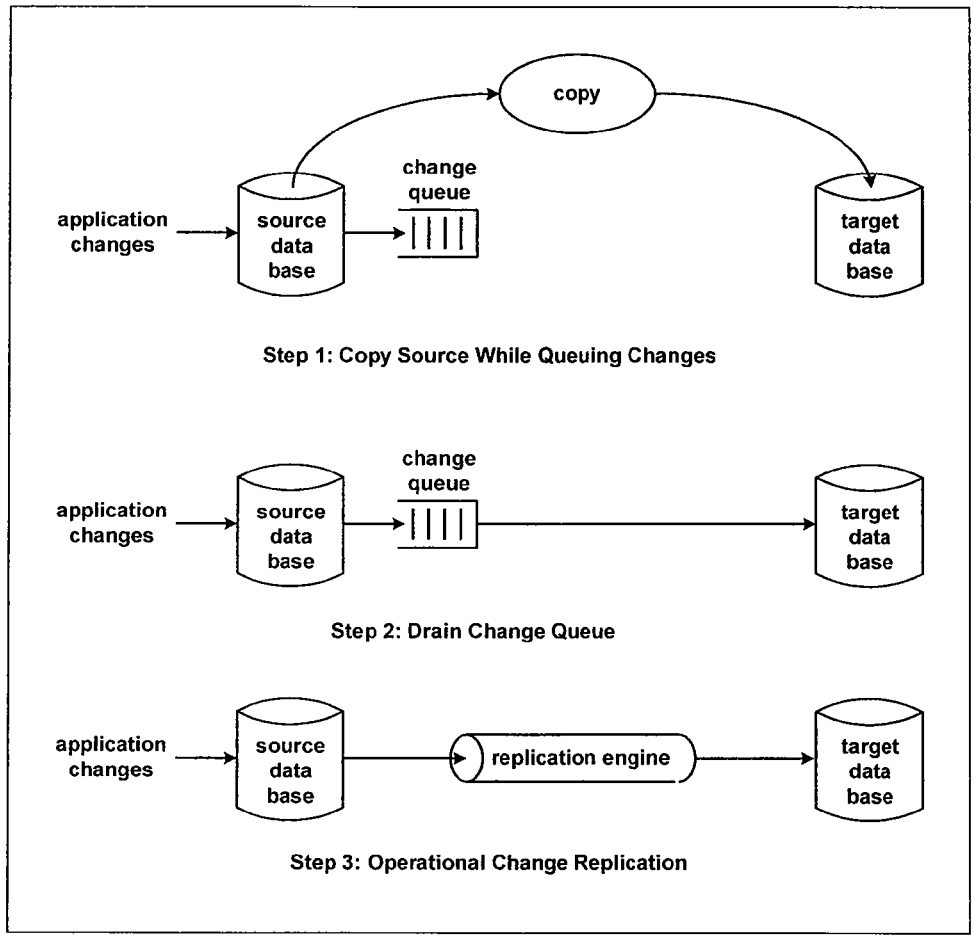
FIG. 2 shows a prior art online loading system with change queuing.

The simplest form of online ETL involves queuing the changes that are being made to the source database during the load operation and then sending those changes to the target database following the completion of the initial load, as shown in FIG. 2. During Step 1, the source database is copied to the target database while the source database is being actively updated by source applications. Database changes made during the load process are queued for later transmission to the target system. When the load operation has been completed (Step 2), the queue of changes is drained to the target system to bring it up-to-date. These changes must also include the changes that arrived during the draining of the change queue.

During this process, the target database is inconsistent and generally unusable. If it is used for queries or reporting, erroneous or stale data may be delivered. Only when the queue of changes has been drained is the target database current, consistent, and available for use. At that time, it can be put into service and kept updated via a data-replication engine that replicates source changes in real time to the target database (Step 3). In some implementations, the change queue in Step 2 is the same change queue used by the operational replication engine; and changes accumulated during the load are replicated following the load by that replication engine.

If the database is large, it could take several hours or even days to load it. Additionally, the rate of changes made to the source database by the application could be very high. During this time, a great number of changes may have been accumulated in the change queue; and the draining of this queue to the target database could itself take another several hours, thus delaying significantly the availability of the target database. In some applications with very high rates of change to the database, it may never catch up.

G. Online Loading with Concurrent Change Replication

Figure 3:
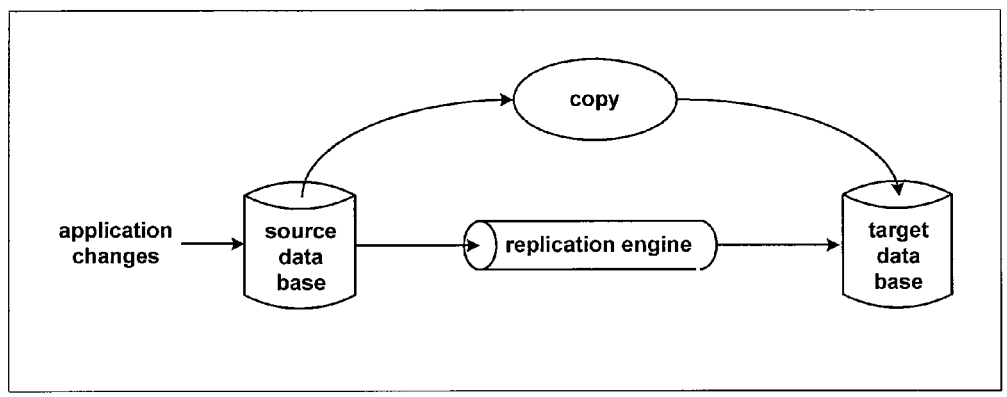
FIG. 3 shows a prior art online loading system with concurrent change replication.

One possible solution to eliminate the time to send changes to the target database following the load is to enable change replication during the load, as shown in FIG. 3. As the load progresses, each change that is made to the source database is sent to the target database via the same data replication channel that will keep the target database synchronized in actual operation. If a change is made to a data item that has already been loaded, the data-replication engine will update that data item at the target database. If a change is made to a data item that has not yet been loaded, it will either be discarded by the replication engine or will be inserted by the replication engine into the target database. In the latter case, the change will later be overwritten by more current data that is being loaded.

Figure 4:
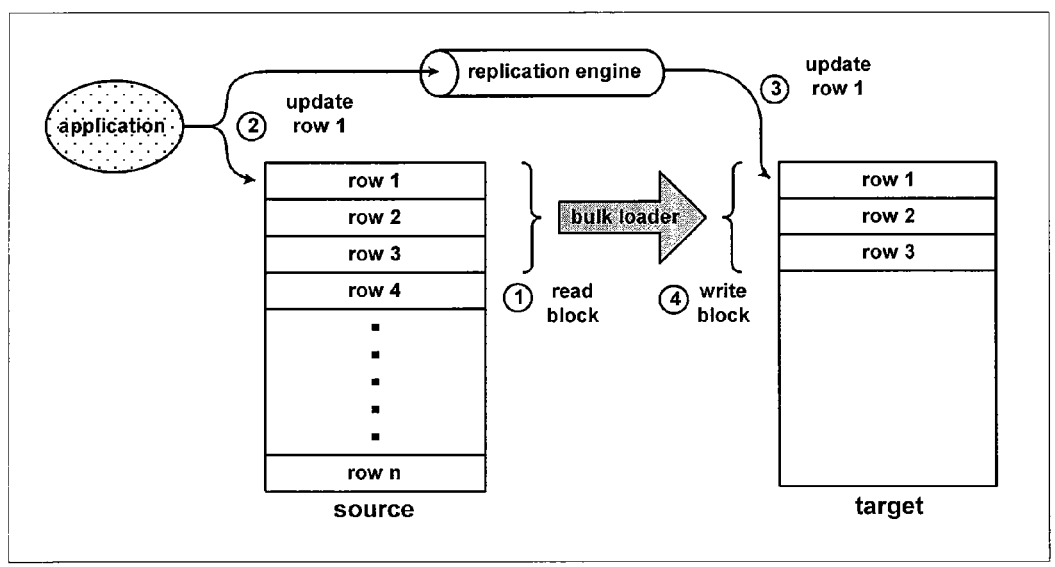
FIG. 4 shows the existing online load problem faced by prior art systems.

This technique will work so long as the database load is faster than the data replication. However, if this cannot be guaranteed, a race condition that could cause data corruption may occur. With reference to FIG. 4, consider the following sequence:

1. The bulk loader reads a block of rows (1 through 3) from the source table.
2. An application updates row 1.
3. The row 1 update is replicated to the target system before the block of rows being loaded. It is discarded because row 1 does not yet exist in the target database. (Alternatively, it can be inserted into the target database but will later get overwritten by the block of rows.)
4. The bulk loader loads the block of rows 1 through 3 into the target database.

Thus, the row 1 update has been lost since it occurred at the source after the block of rows was read but arrived at the target system before the bulk load of row 1. It was overwritten by older data that was being copied.

Thus, proper online loading requires that the bulk load and concurrent updates be sequenced properly.

H. Online Loading with Integrated Change Replication

Proper sequencing of loading and change replication can be achieved by integrating the load function with the data-replication stream. One way to do this is to copy rows via the replication channel. For instance, the load function could traverse the source database by making a null update to each row (a null update effectively forces the row to be replicated without actually changing the contents of it, for example, by setting the value of a column to itself). That row would then be placed in the replication stream along with other changes made to the source database by the source applications, all in proper sequence. The latest version of a row would be replicated, followed by any subsequent changes to that row. However, this would significantly increase the load on the replication channel, perhaps to the point that it could not keep up with the combined load/replication workload. Furthermore, if the replication engine received changes from a change queue, the change queue would have to be able to hold not only the current changes to the database but also an entire copy of the database. This could be terabytes of data and could be unmanageable.

A more efficient method is to extract the data from the source database in large efficient blocks, to load the target database in large, efficient blocks, and to coordinate the load with the replication engine. This approach is exemplified by the SOLV online ETL facility from Gravic®, Inc., described in U.S. Pat. Nos. 7,003,531 and 7,321,904; and U.S. Patent Application Publication Nos. 2008/0109496 and 2008/0109497. By keeping the target database up-to-date as it is being loaded via integrated change replication, not only is concurrency achieved at the source system, but it is also achieved at the target system.

However, this implementation guarantees neither referential integrity, consistency, nor completeness. The maintenance of referential integrity (if present), consistency, and completeness during a target database load is the subject of the present invention.

I. SOLV—An Example of Online Loading with Integrated Change Replication

Figure 5:
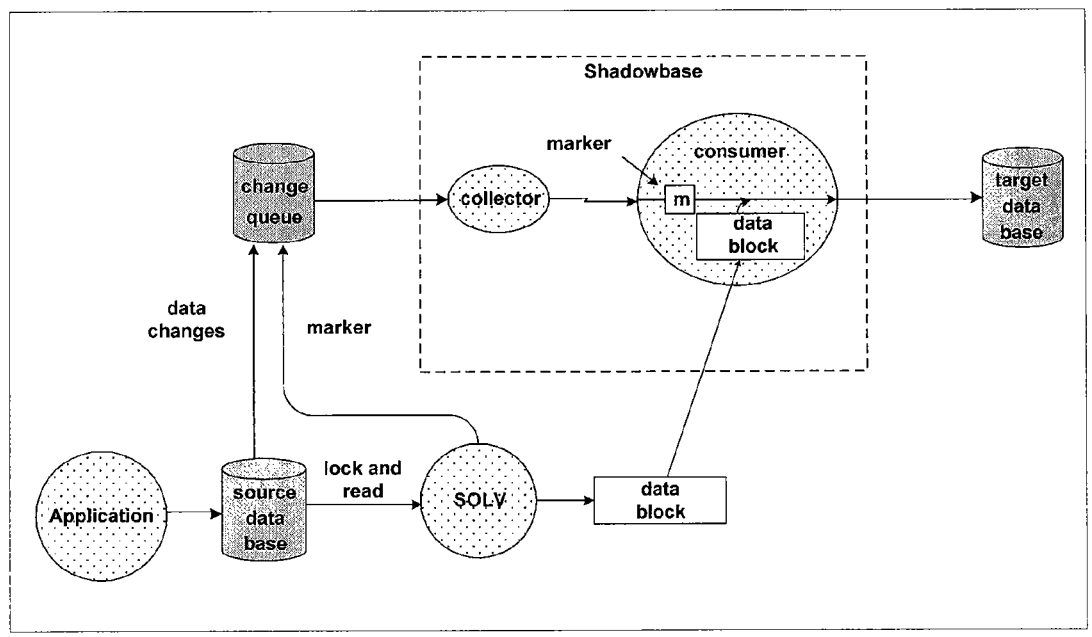
FIG. 5 shows the prior art Shadowbase® On-line Loading and Verification and Validation (SOLV) system.

A SOLV implementation is shown in FIG. 5. It is based on the Shadowbase® data-replication engine, commercially available from Gravic, Inc., Malvern, Pa.

J. The Shadowbase Data-Replication Engine

The Shadowbase data-replication engine uses a Change Queue in which all changes to the source database are written. This Change Queue can be a transaction log maintained by a transaction manager, it can be created by the application either directly or by an intercept library, or it can be created by database triggers. Within Shadowbase, a Collector reads changes from the Change Queue and sends these changes over a communication channel to a Consumer on the target system. The Consumer applies these changes to the target database.

K. The SOLV Load Facility

FIG. 5 illustrates how SOLV integrates the load function with the Shadowbase data-replication engine. SOLV will generally lock and read a data set from the source database. The data set is a set of rows selected according to some criterion, as described later. In one configuration, SOLV will then insert a serialization marker into the replication stream, unlock the data set, and send the data set as a data block directly to the Shadowbase Consumer.

Meanwhile, the Shadowbase Collector is reading changes from the Change Queue and is sending them to the Consumer for posting to the target database. The Consumer will insert the copied rows into the replication stream at the place noted by the serialization marker. Each copied row will be inserted into the target database as it is read by the Consumer from the replication stream. In the event that a row already exists in the database as a result of a previously replicated value, the insert operation can optionally be converted to an update operation.

Since all updates to copied rows in the data blocks are guaranteed to come after the marker (that is, those rows were locked from the time that they were read until the time that the marker was written), no updates will be lost; and all updates will be applied in the proper order.

In some cases, SOLV can be configured to not place a marker in the replication stream. Rather, the load block is sent directly to the Consumer under the assumption that the load channel is much faster than the replication channel, which is often the case. Should this assumption prove false, SOLV can detect that condition and request that the data be resent (otherwise, data corruption may occur).

SOLV provides weak consistency, good concurrency, and good performance, as described next.

L. Consistency

The consistency of the target database requires that the following conditions be met:
  1. All children must have parents (referential integrity).
  2. All user-specified data constraints must be met.
  3. Additionally, it may require that all rows must have a unique primary key (more specifically, the parent rows being referenced by child rows must have a unique primary key that is used in the referencing relationship).

The last condition is inherently met by the load process if it is satisfied by the source database. Each row that is loaded will have a unique primary key.

The first condition can only be met if parent tables are copied before child tables that reference them. This is true for databases in third normal form (3NF). It may be insufficient for denormalized databases, as discussed later. For instance, in the invoicing database shown in FIG. 6a, there are four tables:
  1. A Customer Table provides information for each customer.
  2. An Invoice Table contains common information for each invoice.
  3. A Detail Table contains the detailed information for each line on an invoice.
  4. A Part Table contains information for each part that might be ordered.

The Detail Table refers (through foreign keys) to the Invoice Table and the Part Table. An invoice detail line contains the number of the invoice to which it belongs and the part number that is being ordered via this invoice line. Thus, an invoice detail line is a child of an invoice. Likewise, an invoice detail line is a child of a part because it references a part. Therefore, to maintain referential integrity, the Detail Table cannot be loaded until the Invoice Table and the Part Table are loaded.

Likewise, the Invoice Table refers to the Customer Table. Each invoice row contains the customer ID of the customer ordering the parts. Each invoice is a child of a customer. Therefore, the Invoice Table cannot be loaded until the Customer Table has been loaded.

This leads to the following order of tables to be loaded. The Customer Table must be loaded first, followed by the Invoice Table and Part Table (in either order). Finally, the Detail Table can be loaded. In this way, each child is guaranteed to have a parent, thus satisfying referential integrity.

SOLV can be used to load parent tables before child tables. However, if the parent tables represent the bulk of the database, this may not provide a reasonable window of usefulness for the target database. Additionally, if two tables were to reference each other, SOLV cannot currently load them and maintain referential integrity during the load.

The second condition can only be met if all rows needed to satisfy a user-specified constraint have been loaded. For instance, if an invoice header contains the sum total of the dollar amounts in each of its detail lines, and if the detail lines have not yet been loaded, the invoice total will not correspond to the sum of the dollar amounts of the existing detail lines. The current version of SOLV does not guarantee the satisfaction of user-defined data constraints.

Based on the above, SOLV provides a weak level of consistency. It does guarantee that all rows have a unique primary key. It can guarantee simple unidirectional referential integrity relationships only to the point that performance permits by manually loading the parent before the child(ren). It does not guarantee user-defined data constraints. These limitations are solved by the subject invention.

M. Concurrency

The SOLV method provides high concurrency during the load operation at the expense of performance relative to offline ETL. Concurrency is high since both the source database and that part of the target database that has already been loaded can be used by applications. To enhance source concurrency, SOLV uses shared-read locks of brief duration that allow source applications to read rows that SOLV has locked. These applications, however, cannot modify those rows as long as SOLV holds locks on them.

N. Performance

This method of loading is not as fast as offline ETL since offline ETL can use bulk-extract and bulk-load operations. The SOLV technique generally requires that the sets of data to be loaded must first be locked on the source database and then be read as a data set. This data set can be read as a sequence of rows or as a set of rows depending upon the level of consistency that is specified for the load operation and upon the capabilities of the database. In any case, row or row-set operations are generally less efficient and slower than the bulk-data operations that can be used by offline ETL.

O. SOLV Online-Load Consistency Levels

SOLV currently supports four levels of target-database consistency. These levels offer compromises between consistency, concurrency, and performance. Generally, as the level of consistency increases, target concurrency increases, source concurrency decreases, and performance decreases.

The SOLV consistency levels depend upon the locks that are acquired on the source data set to be copied. Consistency levels in increasing order of the amount of consistency provided are:

1. None
2. Row or Record
3. Transaction
4. File or Table

In all cases but None, simple unidirectional referential integrity can be guaranteed by ensuring that tables that are parents are loaded before their associated child tables. In this way, all child rows will have their parents in the target database. If tables reference each other, SOLV cannot load these in such a way as to satisfy referential integrity. This is a capability of preferred embodiments of the present invention.

The requirement that all tables have unique primary keys is satisfied by the source database. In general, the satisfaction of user-defined data constraints is not supported by SOLV.

Moreover, completeness is not achieved at the target database since at any point in time a parent may not have all of its children. Full referential integrity, consistency, and completeness can be achieved by preferred embodiments of the present invention, as described below.

P. None

Under the None level of consistency, SOLV does not acquire any locks on the data to be copied. (Some databases, such as SQL databases, may lock a row that is being read. In these cases, SOLV Row or Record consistency is being achieved. The performance, consistency, and concurrency attributes are the same as those for the Row or Record consistency level, described next.) It reads through locks to fetch rows whether or not they are locked (this is often referred to as "dirty reads" as the data read may be "undone," or backed out, if the source transaction aborts). Rows may be read in primary-key order, which is usually very fast and efficient (e.g., many databases physically store the row data in logical primary key order). A set of rows of a specified size is fetched and sent to the Shadowbase Consumer as a data block. Therefore, load performance is high.

As a result, there is no impact on the source system (except for the additional processing load). Source concurrency is as high as it is when no load is running.

However, there is no consistency of the target database until the load has completed. Because "dirty" data is being loaded, this data may be inconsistent with other loaded data. The "dirty" data will not be corrected until the lock on that data is released and its updates or backout events for aborted transactions are received by the target system over the replication channel and applied.

Therefore, the target database is unusable as a consistent database until the load has completed, thus resulting in no target concurrency. Should an attempt be made to query the part of the target database that has been loaded, erroneous results may be returned.

Q. Row or Record

SOLV's Row or Record consistency level is similar to its no-consistency level (None) except that SOLV will lock a row with a shared-read lock before reading it. In some cases, such as HP's NonStop SQL/MP database, SOLV will explicitly request a shared-read lock. In other cases, such as HP's NonStop Enscribe database, SOLV will not use a lock—the file (or database management) system will return a consistent (but unlocked) copy of the data being read without acquiring a lock on it once all preceding locks have cleared. Similarly, for some SQL databases, the database manager will return the last committed value of the row (without imposing or leaving a lock), regardless if the row is currently being updated by another transaction (for example, ORACLE'S read-committed). For yet other databases such as some SQL databases, the database manager will implicitly impose a read lock on a row being read via the SQL fetch statement.

Consequently, SOLV will not read "dirty" data through update locks held by other applications. Rather, if a row in the data set to be copied is locked with an update lock, SOLV will either wait for that lock to be released before it locks and reads the row or it will retrieve the last consistent (committed) value of the row and then insert it into the data block to be sent to the Consumer (in this latter case, SOLV will guarantee that its transaction is replayed into the target before the transaction that is updating the row). Note that if a row is locked with a shared-read lock, SOLV can read that row.

As a result, performance is typically worse than it is for the no-consistency case (None) since loading is delayed while SOLV waits for update locks to be released. Source concurrency is somewhat diminished as an application may have to wait for a SOLV read lock to be released before it can update that row. However, applications can read data locked by SOLV since SOLV uses shared-read locks.

To the extent that an application can use the target database with its weak consistency, concurrency is achieved at the target database on the data that has been loaded.

R. Transaction

For Transaction consistency, SOLV begins a transaction and includes each of the rows that it reads in the transaction. SOLV acquires a shared-read lock or equivalent on each source row so that it cannot be modified by an application. When it has read all of the rows in the data set to be copied, or should it reach a transaction limit on the number of locks that it may hold, SOLV writes a marker into the replication stream, commits the transaction, which releases the transaction locks, and sends the data block or blocks to the Consumer. When the marker arrives at the Consumer, the Consumer will insert the one or more data blocks of rows as inserts into the replication stream and then will allow replication from the Collector to continue. It then repeats this process until all rows are loaded.

As a consequence, each row will be inserted into the target database before any subsequent replicated updates are applied. If the row already exists in the target database because of a prior replicated update, the insert operation is converted to an update operation to overwrite the row's contents.

If row-set operations or key-range locks are not supported by the database manager, each row being read must be locked individually, waiting for the release of any update locks in the row range. If row-set operations are supported, then an entire block, such as a range of primary keys, can be requested. SOLV's shared read-lock request will be queued until all previous update locks on the rows in the row set have been released. SOLV's row-set shared-read lock will then be granted.

In this method, source concurrency is somewhat less than the previous methods. SOLV will lock and read rows or row sets until it has filled its block buffer. It will then send the buffer to the target system via a no-waited (asynchronous) write, which is very fast. At this time, it will release its row locks. Source update applications must wait while the row set comprising the transaction is locked and while the data block is filled. However, target concurrency is the same as with the Row or Record procedure. That part of the target database that has been loaded is available for query applications at the target within the consistency level provided by SOLV.

S. File or Table

The File or Table consistency procedure is similar to the Transaction consistency procedure except that an entire file or table, or a partition thereof, is locked and copied. This technique allows the entire range of data (a file, a table, or a large key range) to be locked with one shared-read lock request rather than having to request locks row by row or row set by row set.

This procedure has a higher loading performance than the other levels of consistency since locking a table is much faster than locking individual rows or row sets. Also, much larger blocks of data may be sent to the target database, thus increasing the efficiency of the communication channel.

Source concurrency is reduced relative to the other levels of consistency. This is because the source applications are locked out of updating until the entire table or key range (which could be quite large) is read by SOLV. However, SOLV supports interim target database commits that will apply only a portion of the rows in the block at a time. This allows the data being loaded into the target database to be available sooner.

This procedure can result in a stronger level of target database consistency. If interim commits are not used, only full tables are presented to target applications. In this usage, either an entire table is available, or none of it is available.

Consequently, SOLV provides an accurate point-in-time snapshot copy of the source file, table, or partition thereof at the target system. This is because the entire source data to be copied is locked, and no changes are allowed during the extract of that data. There is no queue of changes that must be applied in order to make the target snapshot of the file, table, or partition an accurate copy of the source snapshot.

Some database managers will allow a table lock request to be granted even when there are outstanding locks against specific row items, or they will allow additional transactions to lock and change rows while this table lock is in effect. In this mode, the database manager typically returns the "last committed" (or consistent) value of the rows that are being updated by the other transaction(s), in other words the last committed value of the row(s) from the time when the table lock was initiated. This allows for other applications to continue to modify the table even when this table lock has been granted, allowing for a higher degree of source application concurrency. When operating in this mode, SOLV will guarantee that the data being loaded is applied into the target before any of these subsequent transactions are applied.

SOLV currently loads only one source file or table, or a multiple of such files or tables or key ranges thereof in parallel that have the same structure, at any one time. It does not load multiple files or tables that have other referential integrity relationships or constraints or differing structures in the same load sequence (it is not aware of these relationships). This capability is what is provided by preferred embodiments of the present invention.

III. DETAILED DISCLOSURE

The present invention discloses an improved loading method that guarantees the referential integrity of that portion of the source database that has been loaded to the target database. In addition, it can also guarantee that the portion of the target database that has been loaded is consistent and/or complete. Three levels of target database correctness are provided that are stronger than existing methods such as SOLV, described above. In order of correctness strength, they are:

1 Correctness Level 1—Referential Integrity

Referential integrity requires that every child will have all parents to which its foreign keys point.

2 Correctness Level 2—Consistent

Consistency requires that referential integrity be satisfied (if present), it may require that every (parent) row have a unique primary key that is referenced in foreign key relationships, and it requires that all user-defined data constraints be satisfied. The latter requirement means that all rows interrelated by user-defined data constraints must exist in the target database.

3 Correctness Level 3—Complete

Just because a portion of a target database is consistent, it does not mean that it is useful or usable because not all of the detail associated with an entity may have been loaded. An entity is identified by its parent row, but all of the information describing that entity may be contained in several child rows. A parent row may properly exist in a consistent database, but only limited information concerning that entity can be obtained if all of its children are not accessible. A complete database ensures that every parent has all of its children in the database.

In order for the partially-loaded database to be maximally useful, it must be complete. To be complete, all parents of a child must be present in the database, all children of a parent must be present in the database, and all rows interrelated by user-defined constraints must be present in the database. A method, in accordance with preferred embodiments of the present invention, for loading a target database in which the portion of the database that is already loaded and made accessible to the target applications provides:

1. referential integrity, or
2. consistency (which includes referential integrity, if present), or
3. completeness (which includes consistency).

A common thread between the consistency levels is the use of database transactions (transaction) or equivalent database locking/isolation functional construct. All related objects, regardless of the file or table from which they come, must be loaded in the same transaction so that target applications only see a correct database, subject to the correctness level. Thus, all related rows either exist (and are accessible) in the target database, or none of them do.

Though it supports full online loading in that both the source database and that portion of the target database that has been loaded can be online and active, this process is also applicable to cases in which either or both databases are offline.

A. Referential Integrity Requirements (Referential Integrity)

One purpose of the present invention is to load a target database in which partial loads exhibit referential integrity.

Referential integrity of a database is that property that ensures that every foreign key in a table points to a valid primary key somewhere in the database. The row that contains the foreign key is a child, and the row that contains the primary key to which the foreign key points is its parent. To ensure referential integrity, every child must have a parent.

For instance, assume that there is an Invoice Table containing the invoice's header information (such as customer information, date of order, etc.) for an invoice along with a Detail Table that contains the individual line items contained on each invoice (FIG. 6a). In this relationship, each invoice line item in the Detail Table contains a foreign key that is an invoice number in the Invoice Table. In this case, the invoice line item row is called a "child;" and the invoice header row is called a "parent." If a child's invoice number is not found in the Invoice Table, a referential integrity violation has occurred. When loading the target database with the invoice and detail rows, if there is no logical ordering of the rows being loaded, there is no guarantee that parent rows will be loaded before their children. As a consequence, children may appear in the partially loaded target database with no parents; and referential integrity will be violated. The partial database being loaded in this case cannot be used for any query applications that depend upon a child having a parent.

To create a partial load that exhibits referential integrity, each load transaction must include the parents of any children that are included in the transaction, or otherwise know that the parents have already been loaded. Two methods that can satisfy this requirement include the following:

1 Load all parent tables before any child tables. In general, there will be a hierarchy of tables (as illustrated later) that can be loaded in such an order that every child in a table being loaded has its parent either already loaded or its parent included in the transaction if it is in the same table as the child. This method may lead to poor performance and concurrency because all of the parent tables associated with a child will have to be loaded before the child can be loaded. In the simple example above, the Invoice Table will be loaded first followed by the Detail Table.

2 Load blocks of child rows, and contain within the transaction the parents of all of the children in the transaction. This will lead to a target database that is useful after the first transaction completes and grows with referential integrity after each transaction. For instance, in the example above, a transaction would include one or more invoice detail rows from the Detail Table as well as the Invoice Table rows that were the parents of the detail rows.

In either case, referential integrity checking can be enabled at the time of the load, which is a important benefit of the present invention.

B. Consistency Requirements (Consistency)

Another purpose of the present invention is to load a target database in which partial loads exhibit referential integrity (if present) and consistency.

To create a consistent partial target database, (1) it may be required that each row has a unique primary key, (2) it is required that referential integrity is enforced (if present) and (3) it is required that all user-defined data constraints are satisfied for the partial database. Requirement (1) for a unique primary key is met if this requirement is satisfied by the source database, and that construct is preserved at the target database. Otherwise, it is not required at the target database either.

To ensure that all data constraints are satisfied, the transaction must include all rows that are related by a data constraint. In the Order-Entry example shown in FIG. 6a, the invoice header contains the dollar amount of all backordered parts for the invoice (Backorder Price). Each detail line carries the number of parts that are on backorder (Backorder Qty). The invoice column for the Backorder Price requires that all detail lines that have a backordered quantity for that invoice exist in the database. Backorder Price is calculated as the sum of the backordered quantities found in the detail lines multiplied by the unit price for the corresponding parts as found in the Part Table.

The transaction for a consistent load can start by choosing an invoice header row from the Invoice Table. To maintain referential integrity, the corresponding customer row must be added from the Customer Table. To maintain consistency, all of the chosen invoice's detail rows that have backordered parts are added from the Detail Table, followed by all of the Part Table's rows that are referenced by the detail rows to maintain referential integrity.

Additional invoice "groups" may be added to the transaction. This transaction has all of the rows included in it to provide referential integrity and the satisfaction of the Backorder Price user-defined data constraint. Therefore, loading the target database using these transactions provides a consistent target database. Following the commit of each transaction at the target database, the database has grown consistently.

C. Completeness Requirements (Completeness)

Yet another purpose of the present invention is to load a target database in which partial loads exhibit referential integrity, consistency, and completeness.

Though a partial target database may be consistent, it may not be complete. That is, though all children have a parent, it is possible that not all parents that have been loaded have all of their own children represented in the partial target database. Therefore, the use of this database may be limited. For instance, an invoice may not yet have all of its line items in the target database. Any report concerning the invoice may be incomplete or inaccurate.

To be completely useful and completely accurate, it is necessary that the entire invoice in the above example—the invoice header, all of the invoice's detail lines, and any other additional rows related by data constraints—all be in the loaded portion of the target database. That is, not only must the partial target database be consistent, it must also be complete. This could be referred to as completeness at the invoice level.

In an alternative embodiment, this definition of completeness can be extended to mean not only the entire invoice be loaded (including the invoice header, all of the invoice's detail lines, and any other rows related by data constraints) into the portion of the target database being loaded, but also that all of the other customer's invoices be loaded in the same manner at the same time in the same transaction (for completeness at the customer/invoice relationship level). Hence, there can be higherarchical levels to the degree of completeness of the partial database being loaded.

Figure 7:
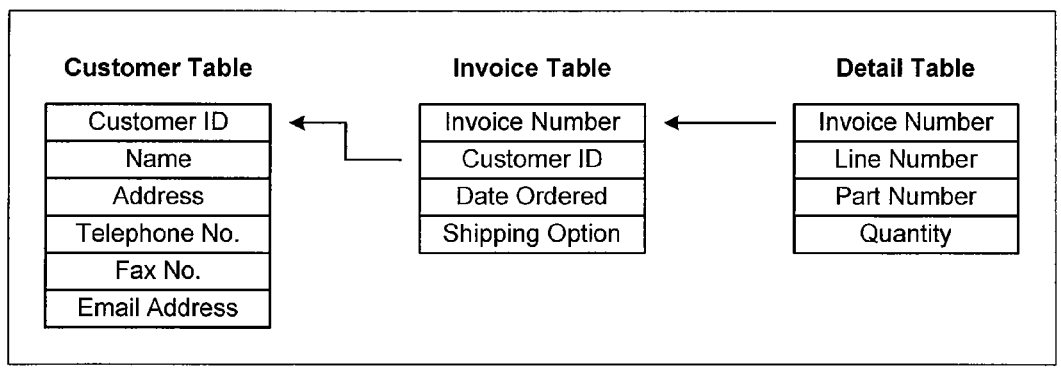
FIG. 7 shows a simplified order-entry database example.

FIG. 7 shows a simplified order-entry database comprising a Customer Table, an Invoice Table, and a Detail Table. To ensure completeness, one might begin with a customer row from the Customer Table and place it in the transaction. All children of that customer row, which are all of the invoices for that customer from the Invoice Table, are added to the transaction. Then all children of that invoice are inserted from the Detail Table into the transaction.

These rows represent a complete customer entity. Additional customer entities can be added to the transaction, and the entire transaction is sent to the target database. There, the entire transaction will be applied to the target database, or one or a few customer entities can be repeatedly applied as sub-transactions to the target database to make them available sooner to target applications.

D. Relaxed Completeness Requirements (Relaxed Completeness)

Still another purpose of the present invention is to load a target database in which partial loads exhibit referential integrity, consistency, and relaxed completeness.

To ensure completeness, all referential integrity and consistency constraints must be satisfied, along with all children of each parent must be loaded at the same time (e.g. in the same database transaction) as the parent. When this last property cannot be easily accomplished, or will result in an unacceptable level of additional overhead, it may be sufficient to relax this last property and not load all of the child data for a parent (provided none of the other properties are violated). This feature of the present invention is discussed in more detail below.

E. Entity Relationships

The processes of the present invention depend upon knowledge of the entity relationships in the database. Each table in the database generally represents an entity—either physical or abstract. Each table may contain foreign keys pointing to rows in other tables. These represent entity relationships.

Once the entity relationships are known, algorithmic methods may be implemented to choose for a transaction those rows that will ensure the desired level of consistency or correctness, as described above.

F. Entity-Relationship Diagrams: One-to-Many

Entity relationships are often described through a variety of entity-relationship diagrams (ERDs). See J. Martin, C McClure, Chapter 20, Entity-Relationship Diagrams, Diagramming Techniques for Analysts and Programmers, Prentice-Hall; 1985 for information on ERDs. As an example, a small invoice database comprising four tables is shown in FIG. 6a a Customer Table, an Invoice Table, a Detail Table, and a Part Table. The Detail Table uses a foreign key that has the value of the invoice number so that each invoice line item identifies the invoice to which it belongs. The Detail Table also has a foreign key pointing to the Part Table to show what part is contained in each line item. The Invoice Table uses a foreign key containing the customer number to link each invoice to the customer information for that invoice.

One form of an entity-relationship diagram describing this database is shown in FIG. 6b. A slash line across a connector indicates a single relationship with the table to which the connector connects or a zero or one relationship if a 0 is appended to the slash. A "crow's foot" on a connector indicates a multiple relationship (one to many or zero to many). FIG. 6b shows that the Customer and Invoice Tables are related by the Customer ID. A customer can have zero or more child invoices, but an invoice must have only one customer parent. This is a "zero-to-many" relationship for the customer and a "one-to-one" relationship for the invoice.

The Invoice and Detail Tables are related by the invoice numbers. An invoice can be a parent to one or more detail lines, but an invoice detail line can have only one parent invoice. This is a "one-to-many" relationship for the invoice, and a "one-to-one" relationship for the detail line.

The Detail and the Part Tables are related by the part number. An invoice detail line can be a child to only one Part parent since in this example there is only one part specified per invoice detail line, but a Part can act as a parent to zero or more invoice detail lines. This is a "one-to-one" relationship for the detail line and a "zero-to-many" relationship for the part.

G. Entity-Relationship Diagrams: Many-to-Many

The above example has been based on one-to-many relationships. Another consideration is posed by many-to-many relationships, as shown in FIG. 8a. In this example, which shows a pair of tables, Table 1 and Table 2, each table has foreign keys pointing to parent rows in the other table. Each row in Table 1 can be pointed to by many rows in Table 2, and each row in Table 2 can be pointed to by many rows in Table 1. Thus, there is no way to easily distinguish parent from child. An example of such a relationship is a professor/student relationship. Each professor has many students, and each student has many professors.

A many-to-many relationship can be converted to a pair of zero-to-many or one-to-many relationships via a cross-reference table (also known as an associative entity) as shown in FIG. 8b. The cross-reference table contains two columns—a column for foreign keys found in Table 1 and a column for foreign keys found in Table 2. The primary key for this table is the concatenation of the two columns. In this case, Tables 1 and 2 are the parents; and the cross-reference table is the child.

There is a row in the cross-reference table for every instance of a foreign-key reference between the two tables. This is shown by way of example in FIG. 8c, which shows a Student Table and a Professor Table linked by a Cross-Reference Table. A professor can have zero-to-many students and a student can have one-to-many professors. All of the students that a professor has can be found by selecting all rows of the Cross-Reference Table containing the professor's ID (PID). Likewise, all of the professors that the student has can be found by selecting all rows of the Cross-Reference Table containing the student's ID (SID). For instance, professor 04 has students 229 and 331; and student 229 has professors 04, 22, and 63.

The Cross-Reference Table is a child to both the Student Table and the Professor Table, which are parents to the Cross-Reference Table. The primary key for the Cross-Reference Table is the unique concatenation of the professor's ID and the student's ID—PID/SID.

H. Entity Relationships: One-to-One

A one-to-one relationship between tables violates normalization. Such relationships are described later.

I. Loading with Referential Integrity, Consistency, and Completeness

The three levels of correctness described previously can be achieved with different strategies derived from the entity relationships.

J. Loading with Referential Integrity—Loading Parents of all Children

The first level of correctness is to enforce referential integrity.

As a load is performed, the referential integrity of the partially loaded target database can be ensured by loading entire tables in such an order that all parent rows are loaded before their child rows. In the above example of FIG. 6, the Customer Table and the Part Table are loaded first since they only act as parents. Next, the Invoice Table is loaded since its parent, the Customer Table, has already been loaded and since it is a parent to the Detail Table. Finally, the Detail Table is loaded. Both during and at the completion of any load operation, the target database has referential integrity.

Alternatively, a set of detail rows can be chosen to be bundled into a transaction. The invoice rows that are parents of the detail rows are also included in the transaction, as are the part rows that are parents of the detail rows. This transaction is loaded onto the target database, and these detail rows now have referential integrity. This can lead to a more useful partial database with referential integrity faster in many cases than having to wait for all parent tables to be loaded first.

Figure 8:
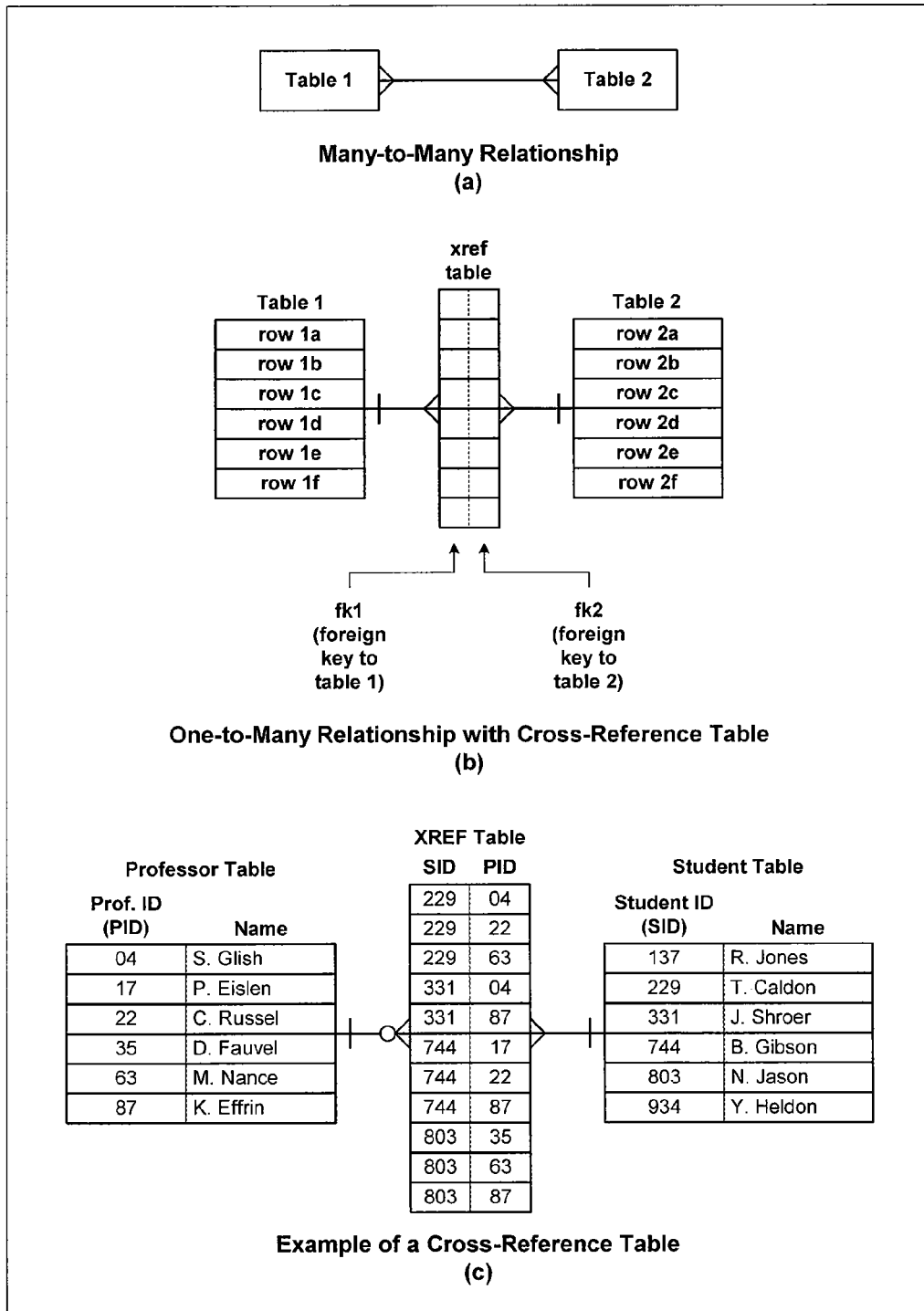
FIG. 8 shows a many-to-many entity relationship example.

In the professor/student example of FIG. 8, referential integrity is preserved if the Professor and Student tables are loaded before the Cross-Reference Table. Alternatively, one or more professors can be chosen and loaded with their entries in the Cross-Reference Table along with all of the students to which the cross-reference rows point. A set of students can also be chosen following the above strategy.

K. Loading with Consistency—Satisfying Data Constraints

The second level of correctness is to enforce data constraints as well as referential integrity (if present).

Database consistency includes the satisfaction of referential integrity (if present) and user-defined data constraints. (The additional potential requirement of a unique primary key for each row is satisfied by the source database). The strategy to satisfy consistency is an extension to referential-integrity loading. In addition to including in a transaction all of the rows required to enforce referential integrity (if present), all additional rows required to satisfy data constraints must be included.

Figure 6:
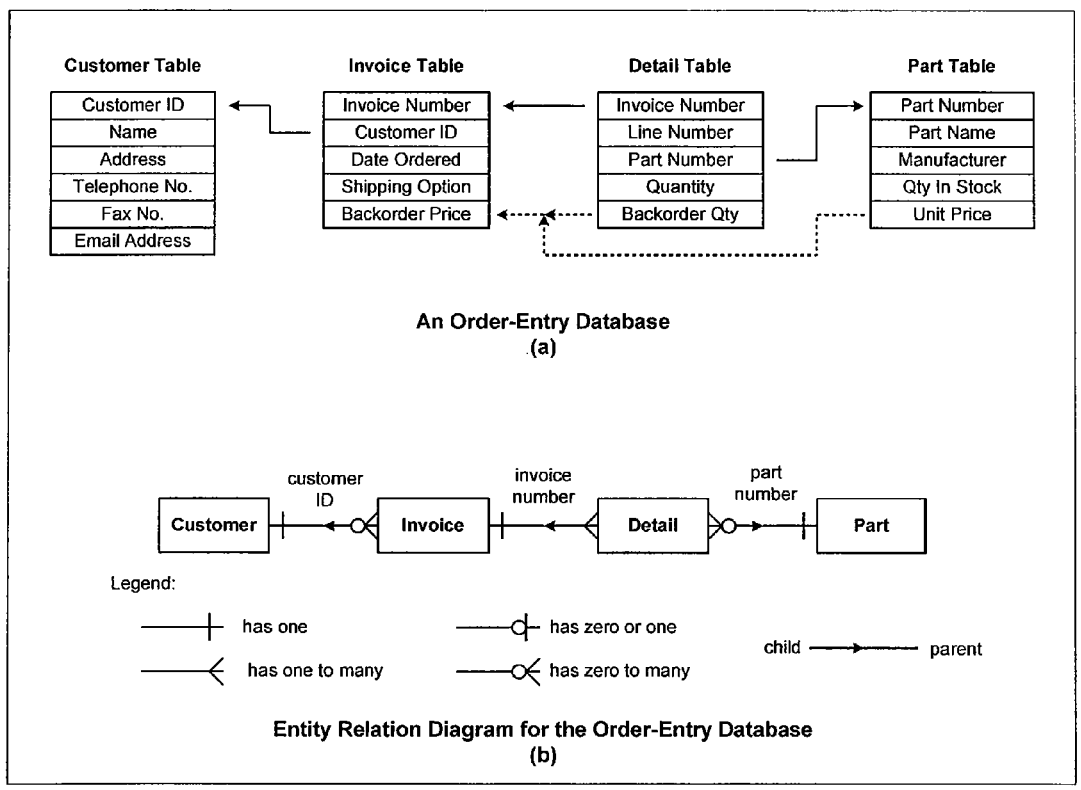
FIG. 6 shows an example one-to-many entity relationships.

For instance, in the example of FIG. 6, an invoice header is first chosen, followed by the customer row to which it refers. Then, all of that invoice's detail rows that contain backordered parts are chosen, along with all part rows referenced by the detail rows. This is a set of invoice rows that are consistent. They satisfy referential integrity and user-defined data constraints.

L. Loading with Completeness—Entity Loading

The third level of correctness is to enforce referential integrity, data constraints, and completeness.

In order for the partially-loaded target database to satisfy completeness, not only must it satisfy consistency (which includes referential integrity, if present), but all children associated with a parent being loaded must also be loaded. One strategy to do this is to load an entire entity—all related parents, children, and other rows related by data constraints—at the same time.

For instance, in the example of FIG. 7, the first step is to select a customer row and all of the invoice rows corresponding to that customer and insert them into a load transaction. Then all of the invoice detail rows corresponding to the invoice rows are selected and inserted into the transaction. This load transaction satisfies referential integrity since all detail children have their invoice parent, and all invoices have their customer parent. It satisfies completeness since the customer has all of its invoice children, and each invoice has all of its detail children.

In the example of FIG. 8, a professor could be selected along with his cross-reference entries. Next, all of the professor's students would be selected along with their other cross-reference entries. Then additional professors of each selected student would be selected along with their cross-reference entries. This process would continue until an entire entity set had been selected. That entity set would then be loaded as a single transaction.

In this way, when the load of one or more entities has been completed, the portion of the database that has been loaded is complete. It can be used by a target application to query any entity that has been loaded. If the source database is being actively updated, and if changes are being replicated to the target database, source concurrency is somewhat less since rows must be locked in various tables across the database. However, target concurrency is high because any application can run with confidence against that part of the database that has been loaded. This includes applications that are making database updates at an active/active target node that is being brought into service.

M. Loading with Relaxed Completeness

The above examples illustrate loading with full completeness. However, they also introduce a problem that may exist in some applications or databases. In the example of FIG. 8, it may well be that including all students of a given professor, then all professors for those students, then all students of those professors and so on, as would be required for full completeness, might, in fact, result in the entire database being considered a single entity. Performance, source concurrency, and target concurrency will all suffer.

Further, with respect to FIG. 6, complete loading would involve the following sequence of steps. To ensure completeness, one might begin with a customer row from the Customer Table and place it in the transaction. All children of that customer row, which are all of the invoices for that customer from the Invoice Table, are added to the transaction. Then all children of that invoice will be inserted from the Detail Table into the transaction. Finally, all part rows that are needed by each of the detail lines will be inserted from the Part Table into the transaction table.

To ensure completeness, all children of each selected part row must now be selected. This is the set of all invoice detail lines that reference this part. To comply with referential integrity, the invoice headers for these additional detail lines must be added to the transaction, followed by their customer rows. This process is repeated by selecting all invoices for the newly added customers and so on until a complete set of entries is obtained. This circular procedure may entail loading a major portion of the database if not the entire database.

Depending upon the applications that will be using the partially-loaded target database, it may be sufficient to satisfy a relaxed level of completeness using a relaxed completeness load. For instance, in the example of FIG. 8, it may be sufficient to define an entity as a single professor and all of his students. In this case, a professor will be selected along with only his students and the corresponding cross-reference rows. These rows will be sent as a single entity. The resulting partially-loaded target database will be suitable for applications that concern a professor and his students but will not be suitable for applications that will, for instance, list the class schedules of one or more students. Some of the rows for that student might not have been loaded yet.

In the example of FIG. 6, a relaxed strategy might be to first select an invoice along with its customer row and all of its child detail rows. Finally, all of the part rows referenced by the selected detail rows will be loaded. In this way, full detail of all loaded invoices are available to target applications; though full reporting of all invoices for a customer or of all invoices that reference a given part will have to wait for the load to complete.

N. Consistency Checking at the Target Database

A major problem faced by current online loading methods is that the target database does not satisfy referential integrity and other data constraints as it is being loaded. Therefore, consistency checking must be turned off at the target database during the load. If during the load a problem occurs that causes a consistency violation, the target database will not detect this until an attempt is made to turn on consistency checking following the load. This action may fail, resulting in the target database being useless until these violations have been discovered and fully corrected. Following a large load with subsequent consistency violations, it is common to once again disable consistency checking so that data processing operations may proceed. Consequently, consistency violations may continue to occur. These database problems must be corrected during normal operations—often a manually-intensive process.

Consistency checking at the target database during the load is an important benefit of preferred embodiments of the present invention. As long as Consistency Level 2 (Consistent) or Consistency Level 3 (Complete) is used for the load process, the target database will always be consistent as it is loaded; and the load can proceed with referential integrity checking and consistency checking enabled. Note that if only Consistency Level 1 loading is being used, referential integrity checking can be enabled during the load.

Being able to turn on some or all consistency checks while the load occurs is a major advance over current state-of-the-art online loading methods.

O. Online and Offline Loading

The present invention supports both online and offline loading of databases.

P. Online Loading

If the source database is online, it is being actively updated during the load. The load can proceed while new changes are being made to the source database and then immediately replicated to the target database.

If loading is faster than replication, the two can proceed independently because existing row data will arrive at the target database before any subsequent replicated updates. However, if loading cannot be guaranteed to be faster than replication, the marker technique described earlier can be used to synchronize the load data stream with the replication data stream.

If loading is done without a marker because it is determined that loading will be faster than replication, the load utility should nevertheless monitor the load process and be prepared to switch to using a marker or request retransmission of a current load block if this condition fails to hold true. (Alternatively, other approaches as defined in the SOLV patents referenced earlier may be used.)

Q. Offline Loading

The source database is offline if it is not being actively updated. This may be because it is not being used or because it is only being used for read-only queries.

In this case, the online loading techniques of the present invention may be used by simply creating transactions of source data in which the rows included in the transaction meet the desired correctness level and by sending these transactions to the target database to be applied. There is no need to coordinate loading with replication as described above since there is no replication being done.

R. Reloads

The above-described embodiments of the present invention can be used to reload a database. During a database reload, the database is loaded on top of itself. Reloading is useful to reorganize a database or to correct parts of it that may have diverged from the source (in other words, to resynchronize the target database to the source when it is suspected that the target has diverged from the source).

For example, reloading can be used to defragment a database that has become heavily fragmented across disk and is therefore suffering performance problems. Alternatively, reloading can be used to correct corrupted index files to make them consistent with the data that they are indexing.

When used to resynchronize the target or parts thereof to the source, the load sequence would compare the incoming load data with the corresponding data (or data range) at the target database. If any discrepancies are found, the load process could make the changes to the target to make it match the source for the data (or data range) that was sent in the load.

S. Redundant Loading

Another problem with loading with completeness is that there is the potential for redundant loading. For instance, if the invoice database of FIG. 6 were to be loaded with the assurance of completeness, each invoice would have to be loaded not only with its detail row but also with its referenced customer and part rows. Since many invoices reference the same customer and part rows, these rows would be loaded over and over again with each invoice entity that referenced them. This could make the load process many times bigger and could take substantially longer than needed.

To solve this problem, the load facility could remember which rows of which tables had been loaded; and it would not duplicate rows that had already been loaded. This could be implemented as memory-resident tables hashed by row primary keys. Alternatively, this could be implemented as compact bit maps in which each bit represented a row. The bit would be set to zero if the row had not been loaded and would be set to one if the row had been loaded. Alternatively, when loading along a key path, this could be implemented as key ranges representing the data set already loaded . . . if the data that needed to be loaded fit within the expanding inclusive key range of data that was already loaded, the redundant data could be removed from the current load step as it was already previously loaded.

T. Test Databases

When upgrades are made to a system, it is necessary to test the modified system before putting it into service. This testing is often done on a separate test system or in an independent partition on the production system.

In either case, it is frequently desired that a test database that reflects the actual production database be used for testing. A consistent load facility or complete load facility can be used to provide a copy of some or all of the production database for test purposes. Though loading the entire production database (or even a meaningful portion of it) might take an extended period of time, testing can be initiated shortly after the load has begun if the partially loaded data represents a consistent or a complete view of that part of the database that has been loaded.

U. Denormalized Databases

If the database is denormalized, special situations can occur. They must be evaluated on a case-by-case basis since there is no limit to the number of ways in which a database may be denormalized. Some examples follow.

V. Denormalization for Performance

One example is that of redundant data. For instance, assume that each invoice row has an invoice total that equals the sum of the backordered amounts, if any, contained in each line item (see FIG. 6). This is a case of denormalization since the same data appears twice in the database. The backorder amount can be determined by adding up the backorder amounts in the individual line-item rows for the invoice, or it can be determined by reading that amount from its header row. This form of denormalization is often used to improve the performance of normalized databases. In the example of FIG. 6, it is much faster to read the denormalized backorder invoice amount from the invoice row than it is to read all of the detail rows and to add their backorder amounts.

If loading without consistency were to be used, partial loads would be inconsistent. A loaded invoice row would violate the data-consistency requirement that its backorder amount equal the sum of the detail-line backorder amounts unless all of the child rows that contained a backorder amount were present in the database. Since the Invoice Table is loaded before the Detail Table, a freshly loaded invoice row would have no detail rows, leading to a zero sum, which may not match the correct backorder total contained in the invoice row.

This problem is solved with consistent loading. An invoice row is loaded with all of its pertinent detail rows (in this example, all of the detail rows that contain a backordered part) so that the invoice backorder amount in the invoice row will match the sum of the amounts in its detail rows.

W. Denormalization Due to Database Restrictions

Figure 9:
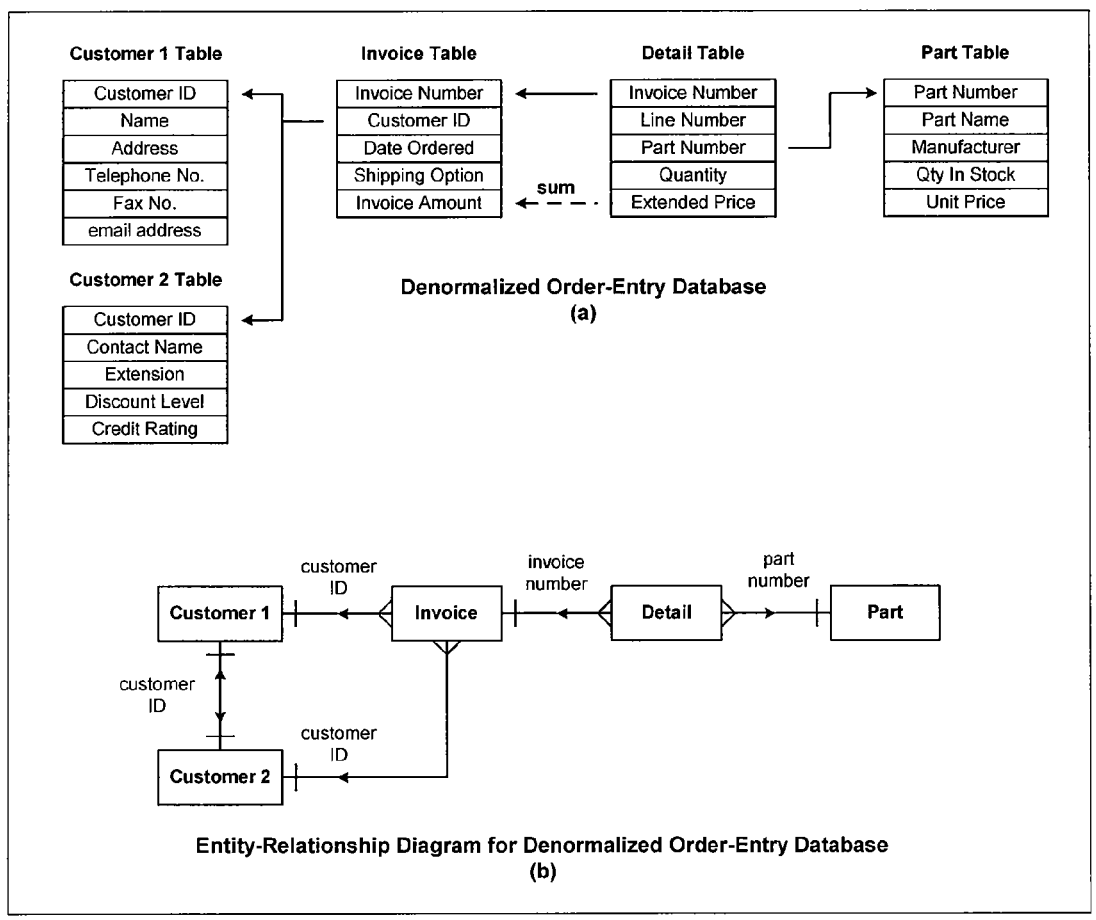
FIG. 9 shows a denormalized entity relationship example.

In some cases, it may be necessary to denormalize a database to get around structural restrictions imposed by the database. For instance, again with reference to FIG. 6, assume that the information to be stored for a single customer requires 6,000 bytes; but the database does not allow rows to exceed 4,000 bytes. To solve this problem, it might be decided to break the customer row into two rows, each with less than 4,000 bytes. This will result in two Customer Tables, as shown in FIG. 9.

These tables have a one-to-one relationship that violates normalization. The primary keys for the rows in one table each point to a companion row in the other table and vice versa. In this case, the two rows for a customer are parents of each other in a one-to-one relationship.

If simple table loading were to be used, the database would not have referential integrity following the load of one of the Customer Tables. This is because that table is a child to the other Customer Table and would therefore exist without its parent.

This problem is solved by loading with referential integrity. An entity includes the rows from both Customer Tables. Therefore, if the row from one table is loaded, so is its companion row from the other table.

X. Programmatic Analysis of the Entity Relationships

The problem then becomes how to programmatically determine the entity relationships so that a load strategy can be formulated. This can be done via a number of approaches. Two examples follow. The first is to parse the schema for the database to understand the relationships. In the second, programmatic analysis can be done by encoding the entity-relationship diagram or by parsing the statements used to create and maintain the database structure.

Regardless of the method used to determine the entity relationships, these relationships can come from the source database environment (for example, if building the data to be loaded for a target database that does not exist yet), from the target database environment (as these are the relationships that must be satisfied for the load to be successful), or from an interim representation format (for example, the target database does not support constraints, yet the data still needs to be loaded in a manner to preserve these relationships to make it useful to the target application(s)).

Y. Parsing the Schema

The schema is the metadata describing the structure of the database. It includes all foreign keys and all data constraints. Entity relationships can therefore be deduced programmatically from the schema. Once these relationships are understood, the analytical program then determines the loading strategy. It can be instructed to perform a referential load (Correctness Level 1), a consistent load (Correctness Level 2), a complete load (Correctness Level 3), or a relaxed complete load (as defined earlier) with a specific load sequence.

In addition, the schema specifies the primary keys for each table.

Though the schema is generally implemented as tables in the database, different database implementations implement their schema in different ways. Therefore, an implementation based on the database's schema may be unique to that database.

Z. Parsing the Entity-Relationship Diagram

Many database systems provide a facility for generating entity-relationship diagrams for their databases. These ERDs can be parsed in much the same way as the schema, as described above, to arrive at the preferred strategy for loading.

AA. Parsing the Create Statements

Another technique to create the load strategy is to parse the statements that created the database. For SQL databases, these are the CREATE and ALTER statements; and they have similar syntax for all SQL databases. For instance, the CREATE statements for the example of FIG. 6 might be the following:

```
CREATE TABLE customer
(custno VARCHAR(5) NOT NULL PRIMARY KEY,
name VARCHAR(16),
address VARCHAR(64),
telephone VARCHAR(12),
fax VARCHAR(12),
email VARCHAR(80)
)
CREATE TABLE part
(partno VARCHAR(10) NOT NULL PRIMARY KEY,
name VARCHAR(16),
manufacturer VARCHAR(32),
quantity INT,
price INT
)
CREATE TABLE invoice
(invoiceno VARCHAR(8) NOT NULL PRIMARY KEY,
custno VARCHAR(5) NOT NULL REFERENCES customer,
date VARCHAR(6),
option VARCHAR(2)
)
CREATE TABLE detail
(invoiceno VARCHAR(8) NOT NULL REFERENCES invoice,
lineno INT,
partno VARCHAR(10) NOT NULL REFERENCES part
qty INT,
price INT,
PRIMARY KEY (invoiceno, lineno)
)
```

The REFERENCES clauses identify the foreign keys. For instance, in the CREATE statement for the Detail Table, the column "invoiceno" is a foreign key referencing the Invoice Table whose primary key is "invoiceno." Likewise, the column "partno" is a foreign key referencing the Part Table whose primary key is "partno."

The syntax of ALTER statements is similar. The set of CREATE and ALTER statements also define the primary keys and the user-defined data constraints.

Thus, the entity relationships are clear from the CREATE and ALTER statements; and these statements can be used to create a strategy for referential, consistent, complete, or relaxed complete loading.

One problem with this approach is that the CREATE and ALTER scripts are often not available or are out-of-date. Therefore, an updated version of the statements needs to be obtained; or the resultant load strategy may possibly be inaccurate.

AB. Encoding the Entity-Relationship Diagram

An entity-relationship diagram can be encoded manually and fed to an analytic program for determining the proper load strategy. An example of encoding the entity-relationship diagram of FIG. 6b might be the following statements:
1 CUSTOMER to many INVOICE using customer ID
1 INVOICE to many DETAIL using invoice number
1 PART to many DETAIL using part number The entities on the left are parents to the entities on the right. Therefore, it can be determined programmatically what the entity load strategy should be. For instance, these statements make it clear that the CUSTOMER entity is the parent of the INVOICE entity and is a child of no entity. Therefore, any invoice that is loaded must have its CUSTOMER entity loaded. The INVOICE entity is parent to the DETAIL entity. Therefore, any DETAIL entity that is loaded must have its invoice loaded. The PART entity is also parent to the DETAIL entity and is a child to no entity, and any DETAIL entity that is loaded must also have its PART entities loaded. Thus, a legitimate load strategy to enforce referential integrity is to load the Customer Table first, then the Part Table, followed by the Invoice Table and Detail Table in that order.

Alternatively, selecting an entity based on relaxed completeness might involve selecting an invoice row, then selecting its associated customer and detail rows, and finally selecting the part rows referenced by the detail rows, and loading all that "related" information as events in the same transaction, then repeating the sequence for additional invoice rows.

It is clear that the entity relationships can be expressed by any number of statement formats.

AC. Preferred Embodiment of Process Flow

The process flow of the preferred embodiment method (10) is illustrated in FIG. 10a. Processing starts at point (11). At Step (12) the method automatically identifies at least one referential integrity constraint regarding the data to be loaded. At Step (13) the method automatically identifies a first subset of data satisfying the at least one RI constraint. At Step (14) the method loads the identified first subset of data into the target database as a unit of work. Optionally, at Step (15) a test is made to see if there are more first subsets of data that need to be loaded. If not, processing stops at point (16), otherwise processing resumes back at Step (13) via optional feedback loop (17).

The process flow of another preferred embodiment method (20) is illustrated in FIG. 10b. Processing starts at point (21). At Step (22) the method automatically identifies at least one referential integrity constraint and consistency requirements regarding the data to be loaded. At Step (23) the method automatically identifies a first subset of data satisfying the at least one RI constraint and a second subset of data that satisfies the identified consistency requirements. The second subset of data includes the first subset of data. At Step (24) the method loads the identified second subset of data into the target database as a unit of work. Optionally, at Step (25) a test is made to see if there are more second subsets of data that need to be loaded. If not, processing stops at point (26), otherwise processing resumes back at Step (23) via optional feedback loop (27).

The process flow of yet another preferred embodiment method (30) is illustrated in FIG. 10c. Processing starts at point (31). At Step (32) the method automatically identifies at least one referential integrity constraint and consistency and completeness requirements regarding the data to be loaded. At Step (33) the method automatically identifies a first subset of data satisfying the at least one RI constraint and a second subset of data that satisfies the identified consistency requirements and a third subset of data that satisfies the identified completeness requirements. The third subset of data includes the second subset of data which includes the first subset of data. At Step (34) the method loads the identified third subset of data into the target database as a unit of work. Optionally, at Step (35) a test is made to see if there are more third subsets of data that need to be loaded. If not, processing stops at point (36), otherwise processing resumes back at Step (33) via optional feedback loop (37).

The process flow of an alternate preferred embodiment method (40) is illustrated in FIG. 10d. Processing starts at point (41). At Step (42) the method automatically identifies at least one consistency requirement regarding the data to be loaded. At Step (43) the method automatically identifies a first subset of data satisfying the at least one consistency requirement. At Step (44) the method loads the identified first subset of data into the target database as a unit of work. Optionally, at Step (45) a test is made to see if there are more first subsets of data that need to be loaded. If not, processing stops at point (46), otherwise processing resumes back at Step (43) via optional feedback loop (47).

The process flow of another preferred embodiment method (50) is illustrated in FIG. 10e. Processing starts at point (51). At Step (52) the method automatically identifies at least one consistency requirement and completeness requirements regarding the data to be loaded. At Step (53) the method automatically identifies a first subset of data satisfying the at least one consistency requirement and a second subset of data that satisfies the identified completeness requirements. The second subset of data includes the first subset of data. At Step (54) the method loads the identified second subset of data into the target database as a unit of work. Optionally, at Step (55) a test is made to see if there are more second subsets of data that need to be loaded. If not, processing stops at point (56), otherwise processing resumes back at Step (53) via optional feedback loop (57).

AD. Preferred Embodiment of System Implementation

FIG. 11 illustrates the system configuration for the preferred embodiment (100). Source Database (110) contains one or more source tables (111), a database change queue (112), and tables with referential integrity constraints, ERDs, and schemas (113). The Replication and Loader Engine (120) receives RI constraints, consistency and completeness requirements (123) from the Source database (these may optionally come from the Target Database (130)). It also receives the current row values of the source tables (121) and changes to the database (122). The Replication and Loader Engine computes units of work (124) (several of which are already compiled, i.e. U11, U12, ..., U15) that satisfy the applicable referential integrity constraints, consistency and completeness requirements and sends them to the Target Database (130) where a Unit of work applier process (131) applies updates (table updates (132)) to the target database tables (133) as units of work. The Unit of work applier process (131) may or may not be a process that runs as part of the Target Database (130) processes.

AE. Summary

The offline loading of databases via current offline ETL products results in a target database that is typically unusable while the load is being performed and is stale by hours or days when the load completes. Offline ETL is not suitable for hot-standby applications, nor is it suitable for active/active systems when adding or recovering nodes. These applications require the ability to load a current database onto a new system while the source database is actively being updated. This is known as online ETL—a capability provided by online loaders.

There are many benefits that can be gained if a target database can be used as it is being loaded. This requires that the partially-loaded target database at least exhibit referential integrity. Preferably, the partially loaded target database should also be consistent or, even better, complete to be maximally useful.

In the current state-of-the-art, online loaders can provide referential integrity for simple unidirectional relationships by loading parent tables before child tables. However, this will delay the availability of the partial target database if the parent tables represent a large proportion of the database. In addition, any applications that require that the child data be available when the parent tables have been loaded will fail.

Unfortunately, state-of-the-art loaders do not handle the 1:1 or many-to-many database structures in which the rows point to each other either directly or indirectly. Preferred embodiments of the present invention solve this limitation.

The present invention teaches a method to load a target database incrementally so that the partial load (data loaded into the target) at any point in time exhibits referential integrity. In addition, a partially-loaded target database can optionally be consistent or complete or, where useful, satisfy a relaxed level of completeness. To achieve these desirable properties, the order to load the data can be manually determined, or methods are provided for analyzing the entity relationships and/or schema of the database structure to determine the optimal loading strategy to achieve the specified results.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable and readable media. The media has embodied (encoded) therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. A method for loading data from a source database that includes multiple files or tables to a target database, the method comprising:
   (a) prior to loading the data from the source database into the target database, automatically identifying at least one referential integrity constraint regarding the data;
   (b) automatically identifying a first subset of the data that satisfies the at least one referential integrity constraint, wherein the first subset of the data includes non-foreign key data from a plurality of the multiple files or tables; and
   (c) loading the identified first subset of the data into the target database as a unit of work, wherein the unit of work is a database transaction.

2. The method of claim 1 wherein step (a) further comprises prior to loading the data from the source database into the target database, automatically identifying consistency requirements regarding the data, and step (b) further comprises automatically identifying a second subset of the data that satisfies the identified consistency requirements, wherein the second subset of the data includes the first subset of the data, and step (c) further comprises loading the identified second subset of the data into the target database as a unit of work.

3. The method of claim 2 wherein step (a) further comprises prior to loading the data from the source database into the target database, automatically identifying completeness requirements regarding the data, and step (b) further comprises automatically identifying a third subset of the data that satisfies the identified completeness requirements, wherein the third subset of the data includes the second subset of the data, and step (c) further comprises loading the identified third subset of the data into the target database as a unit of work.

4. The method of claim 3 wherein the target database also includes multiple tables or files, and the referential integrity constraint regarding the data is between a plurality of the multiple tables or files of the target database.

5. The method of claim 3 wherein the target database is usable during the data loading.

6. The method of claim 3 wherein the target database is online during the data loading.

7. The method of claim 3 further comprising:
   (d) repeating steps (b) and (c) for other third subsets of the data.

8. The method of claim 2 wherein step (a) further comprises prior to loading the data from the source database into the target database, automatically identifying relaxed completeness requirements regarding the data, and step (b) further comprises automatically identifying a third subset of the data that satisfies the identified relaxed completeness requirements, wherein the third subset of the data includes the second subset of the data, and step (c) further comprises loading the identified third subset of the data into the target database as a unit of work.

9. The method of claim 8 wherein the target database also includes multiple tables or files, and the referential integrity constraint regarding the data is between a plurality of the multiple tables or files of the target database.

10. The method of claim 8 wherein the target database is usable during the data loading.

11. The method of claim 8 wherein the target database is online during the data loading.

12. The method of claim 8 further comprising:
   (d) repeating steps (b) and (c) for other third subsets of the data.

13. The method of claim 2 further comprising:
   (d) repeating steps (b) and (c) for other second subsets of the data.

14. The method of claim 2 wherein the target database also includes multiple tables or files, and the referential integrity constraint regarding the data is between a plurality of the multiple tables or files of the target database.

15. The method of claim 2 wherein the target database is usable during the data loading.

16. The method of claim 2 wherein the target database is online during the data loading.

17. The method of claim 1 further comprising:
(d) repeating steps (b) and (c) for other first subsets of the data.

18. The method of claim 1 wherein the source database is online during the data loading.

19. The method of claim 1 wherein the data loading is performed by an online extract/transform/load (ETL) operation.

20. The method of claim 1 wherein the data loading is performed by online loading with concurrent change replication.

21. The method of claim 1 wherein the data loading is performed by online loading with integrated change replication.

22. The method of claim 1 wherein the target database also includes multiple tables or files, and the referential integrity constraint regarding the data is between a plurality of the multiple tables or files of the target database.

23. The method of claim 1 wherein the target database is usable during the data loading.

24. The method of claim 1 wherein the target database is online during the data loading.

25. A method for loading data from a source database that includes multiple files or tables to a target database, the method comprising:
(a) prior to loading the data from the source database into the target database, automatically identifying at least one consistency requirement regarding the data;
(b) automatically identifying a first subset of the data that satisfies the at least one consistency requirement, wherein the first subset of the data includes non-foreign key data from a plurality of the multiple files or tables; and
(c) loading the identified first subset of the data into the target database as a unit of work, wherein the unit of work is a database transaction.

26. The method of claim 25 wherein step (a) further comprises prior to loading the data from the source database into the target database, automatically identifying completeness requirements regarding the data, and step (b) further comprises automatically identifying a second subset of the data that satisfies the identified completeness requirements, wherein the second subset of the data includes the first subset of the data, and step (c) further comprises loading the identified second subset of the data into the target database as a unit of work.

27. The method of claim 26 further comprising:
(d) repeating steps (b) and (c) for other second subsets of the data.

28. The method of claim 25 wherein step (a) further comprises prior to loading the data from the source database into the target database, automatically identifying relaxed completeness requirements regarding the data, and step (b) further comprises automatically identifying a second subset of the data that satisfies the identified relaxed completeness requirements, wherein the second subset of the data includes the first subset of the data, and step (c) further comprises loading the identified second subset of the data into the target database as a unit of work.

29. The method of claim 28 further comprising:
(d) repeating steps (b) and (c) for other second subsets of the data.

30. The method of claim 25 further comprising:
(d) repeating steps (b) and (c) for other first subsets of the data.

31. The method of claim 25 wherein the target database includes a plurality of tables, and the at least one consistency requirement regarding the data is between multiple tables.

32. The method of claim 25 wherein the target database is usable during the data loading.

33. The method of claim 25 wherein the target database is online during the data loading.

34. The method of claim 25 wherein the source database is online during the data loading.

35. The method of claim 25 wherein the data loading is performed by an online extract/transform/load (ETL) operation.

36. The method of claim 25 wherein the data loading is performed by online loading with concurrent change replication.

37. The method of claim 25 wherein the data loading is performed by online loading with integrated change replication.

38. A method for loading data from a source database that includes multiple files or tables to a target database, the method comprising:
(a) prior to loading the data from the source database into the target database:
(i) automatically identifying at least one consistency requirement regarding the data, and
(ii) automatically identifying completeness requirements regarding the data;
(b) automatically identifying:
(i) a first subset of the data that satisfies the at least one consistency requirement, wherein the first subset of the data includes data from a plurality of the multiple files or tables, and
(ii) a second subset of the data that satisfies the identified completeness requirements, wherein the second subset of the data includes the first subset of the data; and
(c) loading the identified first and second subsets of the data into the target database as a unit of work.

39. The method of claim 38 further comprising:
(d) repeating steps (b) and (c) for other second subsets of the data.

40. A method for loading data from a source database that includes multiple files or tables to a target database, the method comprising:
(a) prior to loading the data from the source database into the target database:
(i) automatically identifying at least one referential integrity constraint regarding the data,
(ii) automatically identifying consistency requirements regarding the data, and
(iii) automatically identifying completeness requirements regarding the data;
(b) automatically identifying:
(i) a first subset of the data that satisfies the at least one referential integrity constraint, wherein the first subset of the data includes data from a plurality of the multiple files or tables,
(ii) a second subset of the data that satisfies the identified consistency requirements, wherein the second subset of the data includes the first subset of the data, and
(iii) a third subset of the data that satisfies the identified completeness requirements, wherein the third subset of the data includes the second subset of the data; and
(c) loading the identified first, second and third subsets of the data into the target database as a unit of work.

41. The method of claim 40 wherein the target database also includes multiple tables or files, and the referential integrity constraint regarding the data is between a plurality of the multiple tables or files of the target database.

42. The method of claim 40 wherein the target database is usable during the data loading.

43. The method of claim 40 wherein the target database is online during the data loading.

44. The method of claim 40 further comprising:
(d) repeating steps (b) and (c) for other third subsets of the data.

* * * * *